(12) United States Patent
Ankerst

(10) Patent No.: US 7,512,624 B2
(45) Date of Patent: Mar. 31, 2009

(54) TIGHT INTEGRATION OF PROCESSING AND VISUALIZING TEMPORAL DATA

(75) Inventor: Mihael Ankerst, Seattle, WA (US)

(73) Assignee: The Boeing Company, Chicago, IL (US)

( * ) Notice: Subject to any disclaimer, the term of this patent is extended or adjusted under 35 U.S.C. 154(b) by 481 days.

(21) Appl. No.: 10/788,797

(22) Filed: Feb. 27, 2004

(65) Prior Publication Data

US 2005/0168467 A1      Aug. 4, 2005

Related U.S. Application Data

(63) Continuation-in-part of application No. 10/769,066, filed on Jan. 30, 2004, now abandoned.

(51) Int. Cl.
G06F 17/00 (2006.01)
G06F 17/30 (2006.01)
G06F 7/00 (2006.01)
G06T 11/20 (2006.01)
G09G 5/00 (2006.01)

(52) U.S. Cl. .................. 707/102; 707/1; 345/661; 345/441; 701/30

(58) Field of Classification Search .......... 707/1–2, 707/100, 102, 200; 701/29–30; 345/581, 345/619, 636, 650, 661, 676, 689, 440.1, 345/441, 470; 702/181
See application file for complete search history.

(56) References Cited

U.S. PATENT DOCUMENTS

| | | | | |
|---|---|---|---|---|
| 6,044,371 A * | 3/2000 | Person et al. | .............. | 707/6 |
| 6,691,006 B2 * | 2/2004 | Sinex | .............. | 701/29 |
| 7,124,054 B2 * | 10/2006 | Kim et al. | .............. | 702/181 |
| 2004/0122723 A1 * | 6/2004 | Quintus et al. | .............. | 705/8 |
| 2005/0049912 A1 * | 3/2005 | Troyer et al. | .............. | 705/11 |
| 2005/0065842 A1 * | 3/2005 | Summers | .............. | 705/11 |
| 2005/0108285 A1 * | 5/2005 | Chickering et al. | .............. | 707/104.1 |
| 2005/0132300 A1 * | 6/2005 | Luhrs | .............. | 715/776 |
| 2005/0177540 A1 * | 8/2005 | Ankerst et al. | .............. | 707/1 |
| 2006/0031102 A1 * | 2/2006 | Teller et al. | .............. | 705/3 |

FOREIGN PATENT DOCUMENTS

EP      WO 96/29660      *  9/1996

OTHER PUBLICATIONS

Ankerst et al. ("DataJewel : Tightly Integrating Visualization with Temporal Data Mining", ICDM Workshop on Visual Data Mining, Melbourne, FL, 2003, 19 pages, retrieved from http://ankerst.de/Mihael/publications.html on May 7, 2008).*

(Continued)

*Primary Examiner*—Srirama Channavajjala

(57) ABSTRACT

Methods, computer-readable media, and systems for identifying characteristics of time-related data associable with intervals are provided. A frame is associated with each of a number of intervals in a period. A first data characteristic is identified for data associable with the number of intervals in the period. A body of data is mined to identify a number of first significant intervals, the first significant intervals being intervals for which the first data characteristic is manifested in data associated with each of the first significant intervals. A first representation of the data indicative of the first characteristic is presented in the frame associated with each of the first significant intervals.

72 Claims, 24 Drawing Sheets

OTHER PUBLICATIONS

Sriram Mahadevan et al Handling Real-Time Scheduling Exceptions Using Decision Support Systems, IEEE 2003, pp. 931-935.*

Wolfgang Aigner, et al. "Visual Methods for Analyzing Time-Oriented Data", Transactions on Visualization and Computer Graphics, vol. X, No. X, Month 200X.*

Ankerst M., et al., "Towards an Effective Cooperation of the Computer and the User for Classification." SIGKDD 2000, Boston, MA.

Ankerst M., et al., "Visual Data Mining: Background, Techniques and Drug Discovery Applications." SIGKDD 2002, Tutorial, Edmonton, Alberta, Canada.

Antunes C.M., et al., "Temporal Data Mining: an Overview." SIGKDD 2001 Workshop on Temporal Data Mining, San Francisco, CA.

Daassi C., et al, "Visual Exploration of Temporal Object Databases." Proc. of BDA '00, Oct. 24-27, 2000, Blois, France, pp. 159-178.

Foster, P., et al., "A Survey for Scaling Up Inductive Algorithms." Data Mining and Knowledge Discovery Journal, 2:131-169, Kluwer, 1999.

Gehrke J., et al., "RainForest—A Framework for Fast Decision Tree Construction of Large Data Sets." Data Mining and Knowledge Discovery Journal, 4:122-162, Kluwer, 2000.

Havre S., "ThemeRiver: Visualizing Thematic Changes in Large Document Collections." IEEE Transactions on Visualization and Computer Graphics, vol. 8, No. 1, Jan.-Mar. 2002.

Hellerstein J.M., et al., "Informix Under Control: Online Query Processing." Data Mining and Knowledge Discovery Journal, 12:281-314, Kluwer, 2000.

Hinneburg A., et al., "HD-Eye: Visual Mining of High-Dimensional Data." IEEE Computer Graphics and Applications, vol. 19, No. 5, 1999.

Keim D.A., et al., "Hierarchical Pixel Bar Charts." IEEE Trans. on Visualization and Computer Graphs, vol. 8, No. 3, pp. 255-269, 2002.

Mackinlay J.D., et al., "Developing Calendar Visualizers for the Information Visualizer." Proc. UIST '94, 1994.

Sarawagi S., et al., "Integrating Mining with Relational Database Systems: Alternatives and Implications." SIGMOD Conference 1998, 343-354.

Van Wijk J.J., "Cluster and Calendar Based Visualization of Time Series Data." IEEE Info Vis '99, San Francisco, October.

Yang L., "Interactive Exploration of Very Large Relational Datasets through 3D Dynamic Projections." SIGKDD 2000, pp. 236-243, Boston, MA.

* cited by examiner

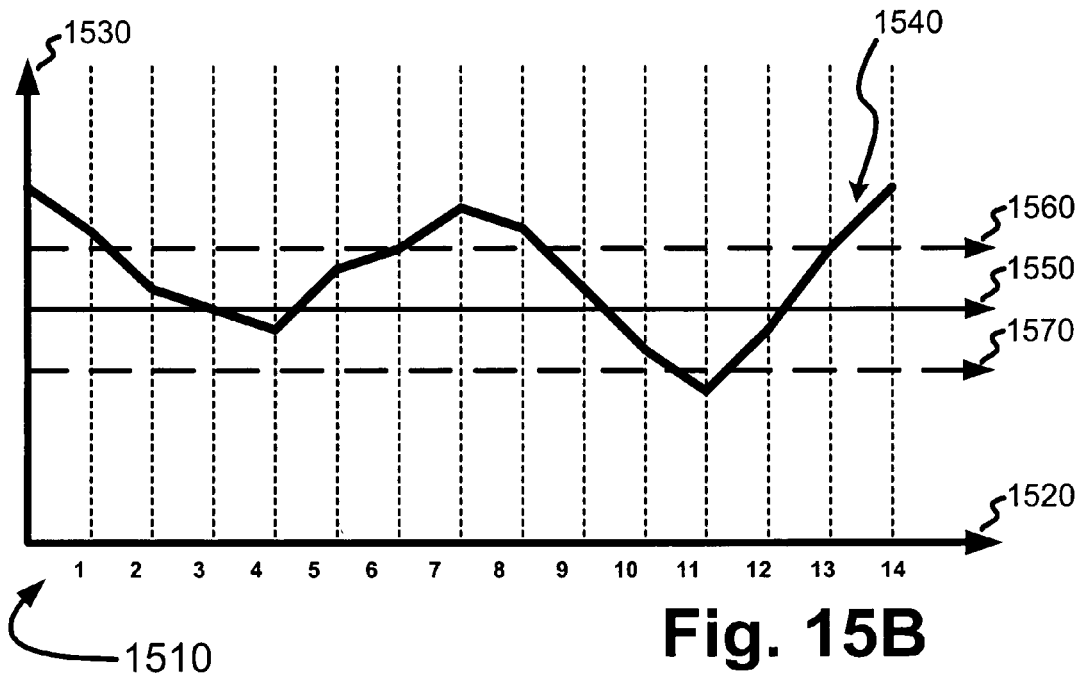
Fig. 15A
Fig. 15B
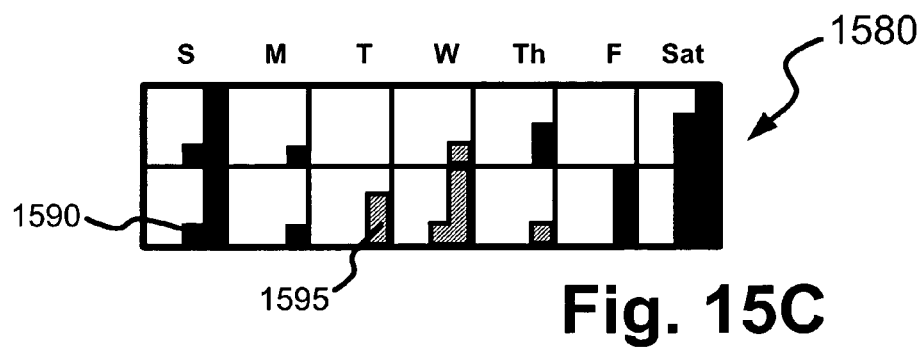
Fig. 15C

US 7,512,624 B2

TIGHT INTEGRATION OF PROCESSING AND VISUALIZING TEMPORAL DATA

CROSS-REFERENCE TO RELATED APPLICATIONS

This application constitutes a continuation-in-part of the commonly-owned U.S. patent application Ser. No. 10/769,066 filed Jan. 30, 2004, now abandoned.

FIELD OF THE INVENTION

This invention relates generally to event monitoring and, more specifically, to analysis and presentation of event data to facilitate analysis of the event data to identify data trends and temporal correlations.

BACKGROUND OF THE INVENTION

Computers have revolutionized the ability to collect, sort, manipulate, and store data. The data processing capacities of computers have transformed industries from banking to transportation. The data processing abilities of computers have also created a universe of other industries from merchandising to communications that otherwise never would have been possible.

The evolution of display and graphics technologies emerging over the last few decades has further extended the usefulness of computers. It is well documented how much better people can assimilate data presented in the form of graphs or other visual representations as compared to how well they can assimilate the same information presented in the form of text and tables. Because even a commonplace personal computer can transform columns of numbers and text into a colorful, multidimensional graph or chart, computers not only collect, sort, manipulate, and store data, but can also help distill the information into a human-useable form.

FIG. 1 shows a conventional data-processing system 100. The system 100 typically has three principal layers: a data source layer 110, a processing layer 130, and a visualization layer 150. The data source layer 110 generally incorporates a number of data storage devices 120. The data storage devices 120 typically include one or more of direct-access storage devices (DASDs) such as hard disks, diskettes, or CD-ROMs. The processing layer 130 typically incorporates data-processing subsystems of the system 100 such as microprocessors and random access memory devices (RAM) in which operations are performed on data stored in the data source layer 110. The visualization layer 150 incorporates at least one of a display 160 or another device, such as a printer, configured to generate printed output 170. The visualization layer 150 allows raw data stored in the data source layer 110 and/or processed by the processing layer 130 to be presented to the user for review. The information displayed may include charts or graphs selected by the user to try to evaluate the content and/or meaning of the data.

FIG. 2 shows one form of data that it may be desirable to present using a data processing system such as the system 100 (FIG. 1). FIG. 2 shows a calendar month 200 which includes a number of days. For each day of the month, for example a day 210 such Jan. 28, 2002, various event data 220 may be logged in an event log, a portion 230 of which is shown in FIG. 2. Data 220 logged for the day 210 may include one or more events 240 and 250 that occurred on the day 210. In FIG. 2, the data 220 logged in the portion of the event log 230 includes a series of aircraft maintenance events 240 and 250. Each of the events 240 and 250 may include a number of fields such as a date 260, an event type 270, a code 280 indicating the type of event, a location of the event 290, and/or other data (not shown). In the data 220 shown in the portion of the event log 230, for example, for the date 260 of Jan. 28, 2002, the event type 270 may include a broken door, a tail light failure, or another event. The code 280, which might include an Air Transport Association (ATA) code or some other alphabetic, numeric, or alphanumeric coding scheme, includes one code to represent the broken door and another to indicate the tail light failure. The codes 280 listed here are "X" and "Y" but could include any suitable single-digit or multiple-digit coding scheme. The location 290 includes Seattle, Chicago, or another location.

Using the processing layer 130 (FIG. 1), the data 220 stored in the portion of the event log 230 may be correlated by data 260, event type 270, code 280, and/or location 290 to generate reports. Reports might be created to tally how many events of each type transpired to determine if original parts may be failing too frequently. Alternatively, the reports might be developed to help human analysts interpret what type of parts inventory and personnel and/or skills are needed, where the parts are needed, and when.

To better distill frequency of event types, trends, or other information from the data 220 stored in the portion of the event log 230, it may be desirable to generate a chart or a graph. FIG. 3, for example, shows a bar graph 300 that may be generated from the event data 220. The bar graph 300 may collect a number of events 240 and 250 (FIG. 2) that have taken place according to a number of event types 270 or codes 280 or for a day 210, a month 200, or another period of time.

The graph 300 shows a number of events 310 listed according to event type, including events collected for categories such as doors 320, engines 330, electronics 340, and lights 350. The graph 300 may show a number of events for the different categories 320, 330, 340, and 350 for an hour, a day, a week, a month, a year, or another unit of time. Thus, the graph 300 pictorially or graphically represents series of events that have taken place.

Whether the information is useful to a human analyst may depend on what the human analyst seeks to discern from the data represented. For example, if the human analyst is seeking to identify trends, such as times or dates when these events tend to peak, the graph 300 may not be particularly useful. Hypothetically, if graphs 300 were generated for the different categories 320, 330, 340 and 350 for every day of one or more years, the human analyst would have to compare hundreds upon hundreds of graphs looking for trends. Considered in this context, the graphs that might have been relatively useful to compare event totals when looking at one graph or a few graphs at a time now are no longer nearly as helpful.

FIG. 3B illustrates another conventional way of visualizing data, such as data which may be distilled from a portion of an event log 230. More particularly, FIG. 3B shows a line graph 355 that might be used for viewing numbers of occurrences or other measurements occurring over time. The line graph 355 suitably includes one or more lines 360, 370, 380, and 390, each of which recounts a status of a different measurement over time. Although a legend 395 might be included to clarify which of the lines 360, 370, 380, and 390 depicts which measurement, from FIG. 3B one can appreciate that, especially as more and more measurements are added, or more and more graphs 355 are presented the data represented by such a graph 355 may be difficult to assimilate.

Manual evaluation of such data can be time-consuming. Even when appropriate human resources are available to analyze such information, presented with large quantities of data, significant variations in data may be lost; certainly subtle but important variations similarly may be lost.

Thus, there is an unmet in the art for mining time-related data to identify variations of potential interest, and for graphically presenting time-related data spanning long periods of time to facilitate enhanced analysis of the data.

SUMMARY OF THE INVENTION

Embodiments of the present invention provide for identification and presentation of data characteristics of time-related data. For data associable with intervals in a period, such as days in a month, a user can request to view unusual data points. For example, the user may request a report of those days for which associated event data exceeds a standard deviation, longest streaks of intervals for which a standard deviation was exceeded, and similar requests.

Embodiments of the invention may advantageously mine the associated data to identify intervals in which the requested unusual data is manifested. In frames representing the intervals or days in which the requested data is manifested, a visual indication of the data is presented. For example, a relative number of points reflecting a proportion of a magnitude of the identified data relative to a limit or maximum is contiguously displayed in the frame representing the interval associated with the data. The points are displayed in a color or pattern visually distinct from the frame and/or other representations presented in the frame. The frames suitably are presented in a calendar-style format that is a familiar metaphor allowing the user better to appreciate how events of interest or concern may correlate with seasons, parts of weeks, parts of months, holidays, or other periodic events that an analyst may intuitively appreciate.

More particularly, methods, computer-readable media, and systems for identifying characteristics of time-related data associable with intervals are provided. A frame is associated with each of a number of intervals in a period. A first data characteristic is identified for data associable with the number of intervals in the period. A body of data is mined to identify a number of first significant intervals, the first significant intervals being intervals for which the first data characteristic is manifested in data associated with each of the first significant intervals. A first representation of the data indicative of the first characteristic is presented in the frame associated with each of the first significant intervals.

BRIEF DESCRIPTION OF THE DRAWINGS

The preferred and alternative embodiments of the present invention are described in detail below with reference to the following drawings.

FIG. 15A is a generalized calendar of a two-week period;

FIG. 15B is a line graph for events logged for the two week period of FIG. 15A;

FIG. 15C is a representation of the two-week period including representations of the events occurring during that period according to an embodiment of the present invention;

DETAILED DESCRIPTION OF THE INVENTION

The present invention relates to methods and systems for identifying characteristics of time-related data associable with intervals. Many specific details of certain embodiments of the invention are set forth in the following description and in FIGS. 4-20 to provide a thorough understanding of such embodiments. One skilled in the art, however, will understand that the present invention may have additional embodiments, or that the present invention may be practiced without several of the details described in the following description.

By way of overview, methods, computer-readable media, and systems for identifying characteristics of time-related data associable with intervals are provided. A frame is associated with each of a number of intervals in a period. A first data characteristic is identified for data associable with the number of intervals in the period. A body of data is mined to identify a number of first significant intervals, the first significant intervals being intervals for which the first data characteristic is manifested in data associated with each of the first significant intervals. A first representation of the data indicative of the first characteristic is presented in the frame associated with each of the first significant intervals.

Figure 4:
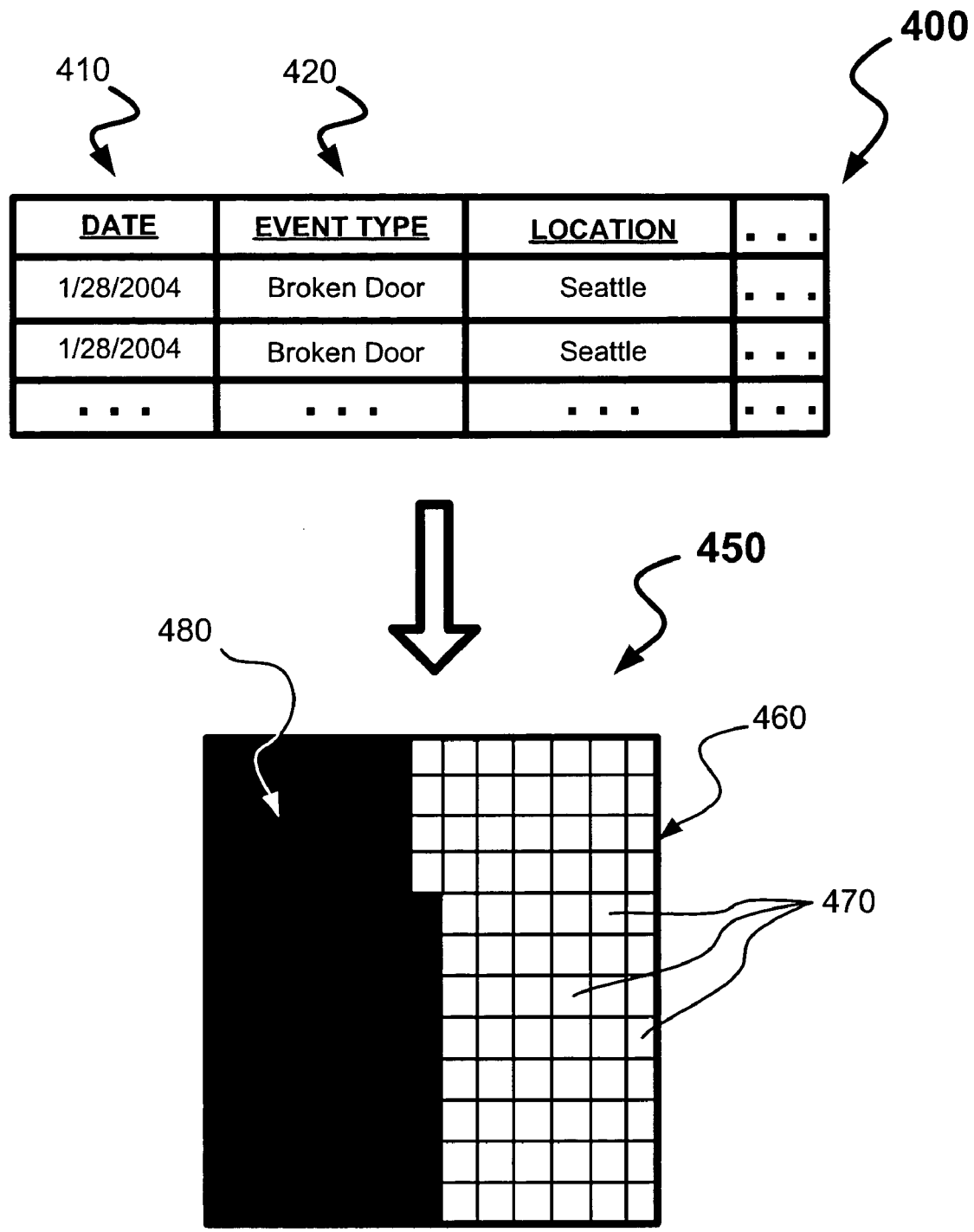
FIG. 4 is a portion of an event log storing events of a single type and a representation of events for a day from the event log according to an embodiment of the present invention.

FIG. 4 shows a portion of an event log 400 storing events of a single type and a representation 450 of events for a day from the event log according to an exemplary, non-limiting embodiment of the present invention. The events of a single type actually include only events of a single type or include a group of events elected to be presented as a single, composite type. In the example illustrated in FIG. 4, the interval is a day associated with a frame 460. In particular, the day is Jan. 28, 2004, a date 410 covered by the event log 400. An event type 420 depicted in the event log 400 is "Broken Door." A number of "Door Broken" events is a data quantity being evaluated using an embodiment of the present invention for a number of days in a period. Because the interval is a day, the period suitably includes a plurality of days, one or more weeks, one or more months, or one or more years, or other periods of potential interest.

The frame 460 is configured to display a maximum number of points 470. Each of the points suitably includes one or more pixels or another suitable subdivision of a displayable medium. A shaded area 480 of the frame 460 is an aggregation of a number of points 470 used to display the data quantity being represented. The points 470 in the shaded area 480 suitably are presented contiguously.

The data quantity represented, a number of instances logged as involving a "Broken Door" in this example, are counted or collected from a log, database, or other data repository. The data quantity is represented as a number of points 470 included in the shaded area 480. The shaded area 480 in proposition to the frame 460 as a whole represents a relative magnitude of the data quantity being represented for the interval relative to a data quantity limit. The data quantity limit suitably is approximately equated with a maximum number of points 470 within the frame 460. Thus, in one presently preferred embodiment, equation (1) shows how the shaded area 480 represents the data quantity being represented:

$$\frac{\text{Data Quantity Represented}}{\text{Data Quantity Limit}} = \frac{\text{Number Of Points In Shaded Area}}{\text{Maximum Number Of Points In Frame}} \quad (1)$$

Figure 3A:
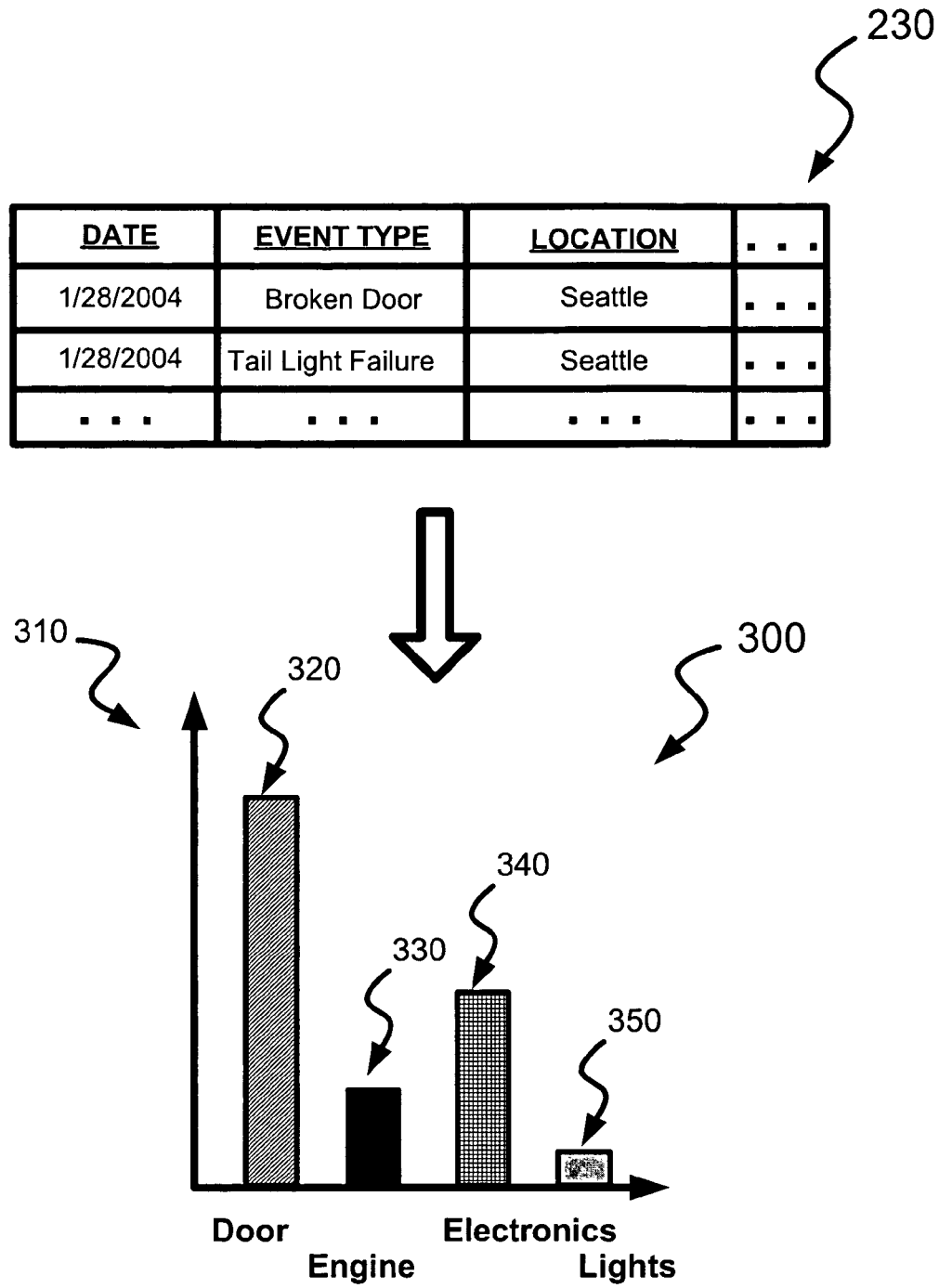
FIG. 3A is the portion of the conventional event log of FIG. 2 and a conventional bar graph representing entries in the event log.
Figure 3B:
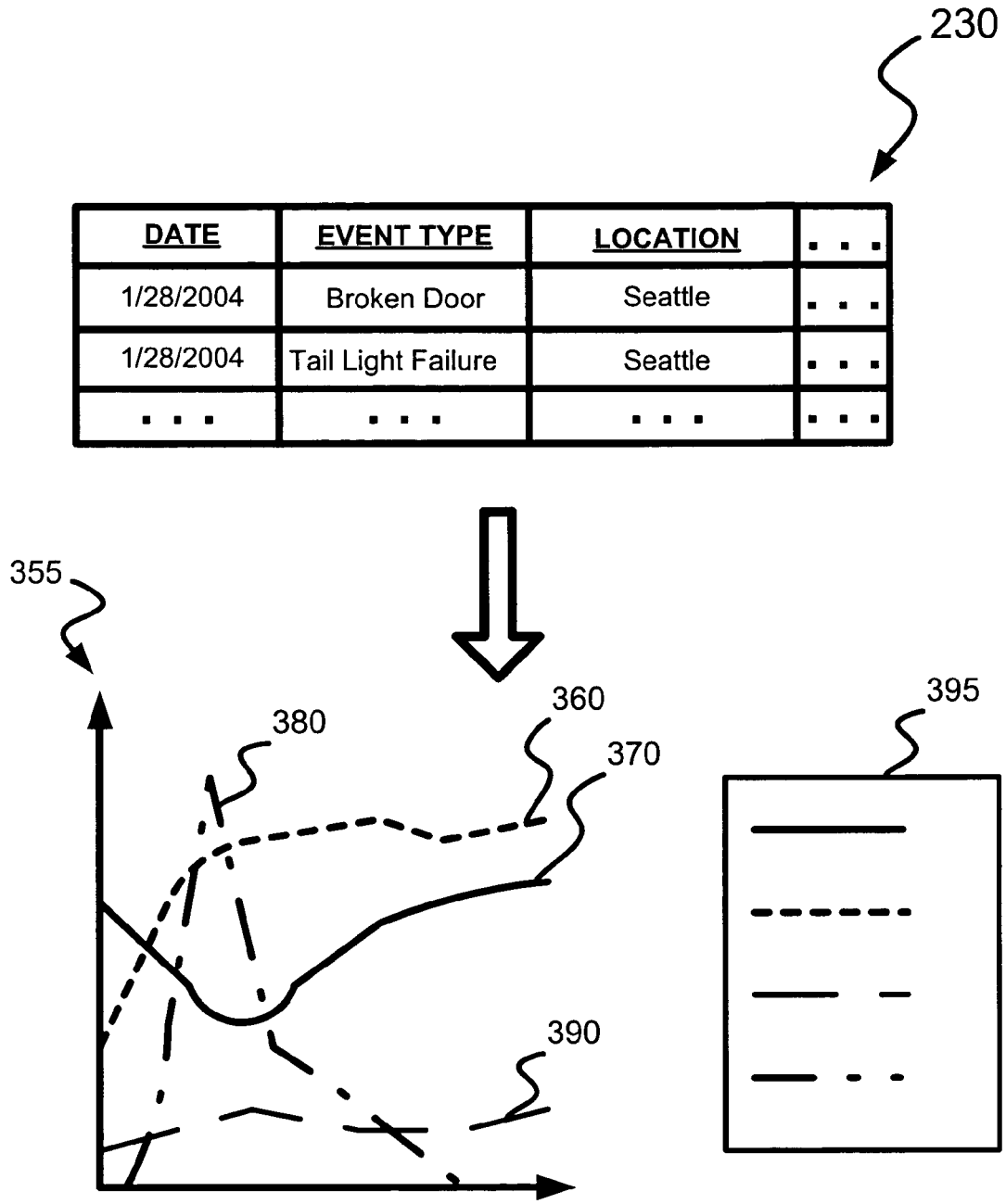
FIG. 3B is the portion of the conventional event log of FIG. 2 and a conventional line graph representing entries in the event log.

The representation 450 provides a way of viewing the data quantity that differs from the way afforded by the bar graph 300 (FIG. 3). In the bar graph 300, each of the bars representing events occurring in each of the categories 320, 330, 340, and 350 effectively are measured against a unitized vertical axis. Each of the bars thus indicates a relative magnitude of the quantity expressed by each by comparing the height of the bar to the vertical axis. In the representation 450, a proportion of points 470 in the shaded area 480, as opposed to points in the nonshaded area 490, indicate a relative magnitude of the data quantity represented. The representation 450 provides benefits over the graph 300 particularly when viewing the data quantity represented over time as shown in FIG. 5.

Figure 5:
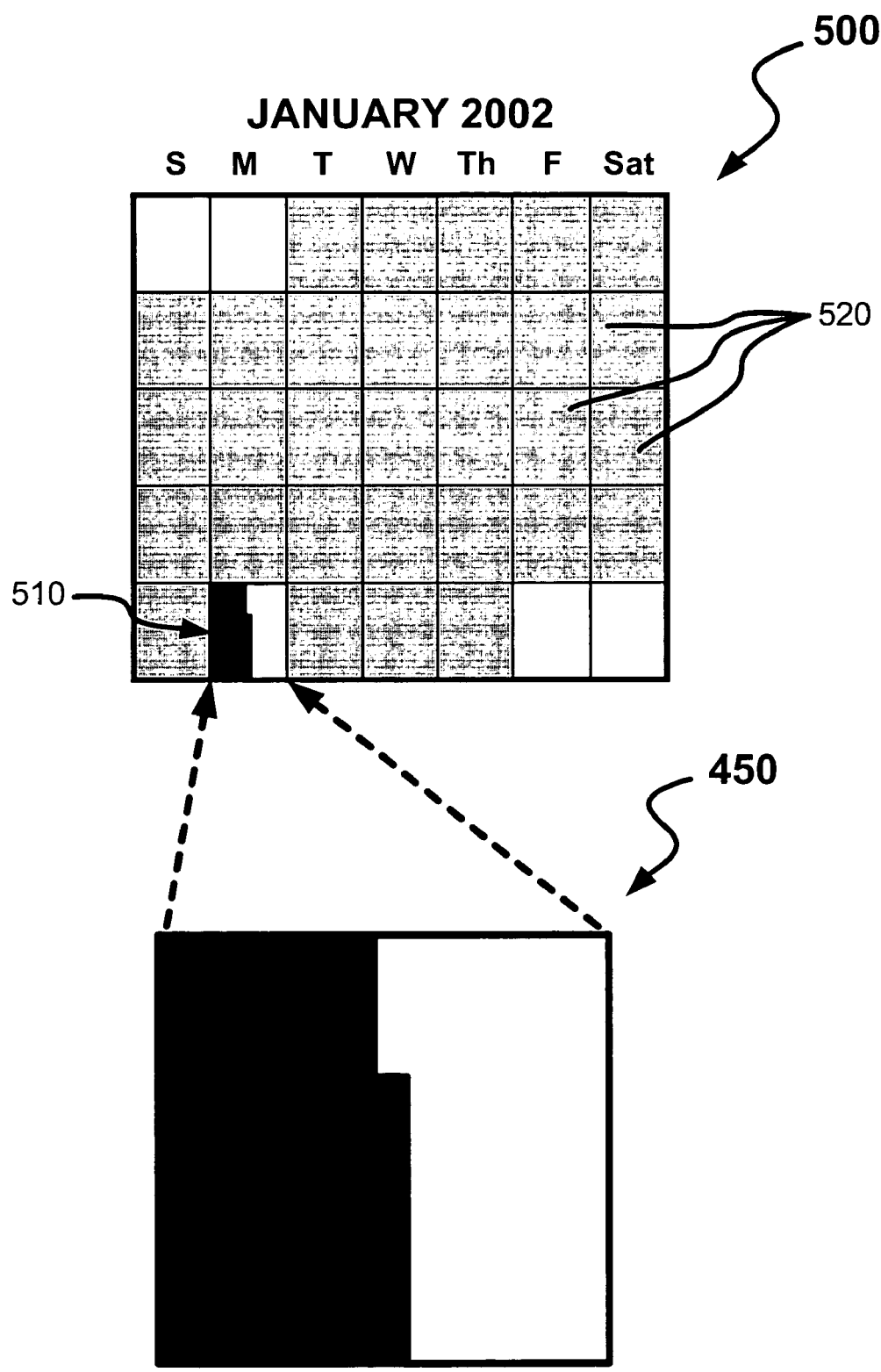
FIG. 5 is the representation of FIG. 4 shown as part of a calendar month.

FIG. 5 shows the representation 450 of FIG. 4 shown as part of a calendar month 500. The representation 450 is miniaturized to a scaled representation 510. Similar representations can be generated for each day 520 in the calendar month. As compared to the graph 300 (FIG. 3) which expresses relative magnitude of a data quantity being represented with a vertical bar, the representation 450 and its miniaturization 510 show the relative magnitude of the data quantity in two dimensions. It will be appreciated that using both dimensions of the frame 460 (FIG. 4) makes the relative magnitude of the data quantity represented easier to discern.

Figure 6:
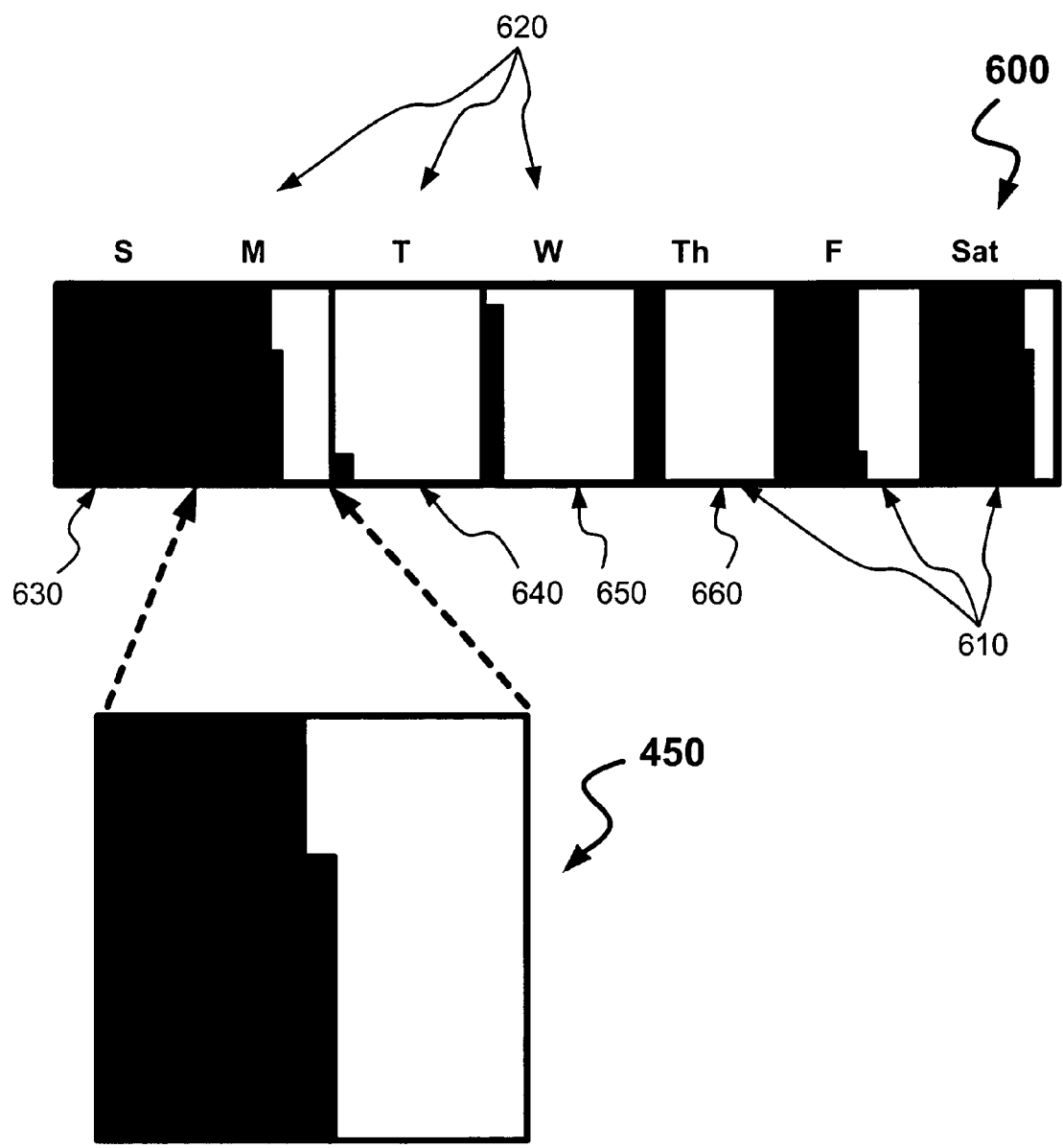
FIG. 6 is the representation of FIG. 4 shown as part of a calendar week along with representations of event logs for other days of a week according to an embodiment of the present invention.

FIG. 6 is the representation 450 of FIGS. 4 and 5 shown as part of a calendar week 600 along with representations 610 of event logs (not shown) for other days of a week 620 according to an embodiment of the present invention. As can be seen from FIG. 6, the calendar week 600 allows an analyst to discern variances in the data quantity being represented between days 620. For example, one can see that the data quantity represented, whether a "Broken Door" or another quantity, is at a maximum on Sunday 630, decreasing to a minimum on Tuesday 640, and increasing Wednesday 650 and Thursday 660 to and through the weekend. With such information, an analyst can identify trends and, thus, can better assess parts and repair and/or replacement skills that might be needed on days of higher occurrences versus days having lower occurrences.

FIG. 6 shows the days of a week listed along a first, horizontal axis and a week, which could be any number of weeks, listed along a second, vertical axis. It will be appreciated that the axes could be reversed to accommodate preferences or other concerns, or in any other alignment suited to the user's preferences or requirements, such as by overlaying or "stacking" corresponding intervals to facilitate identification of trends.

Figure 7:
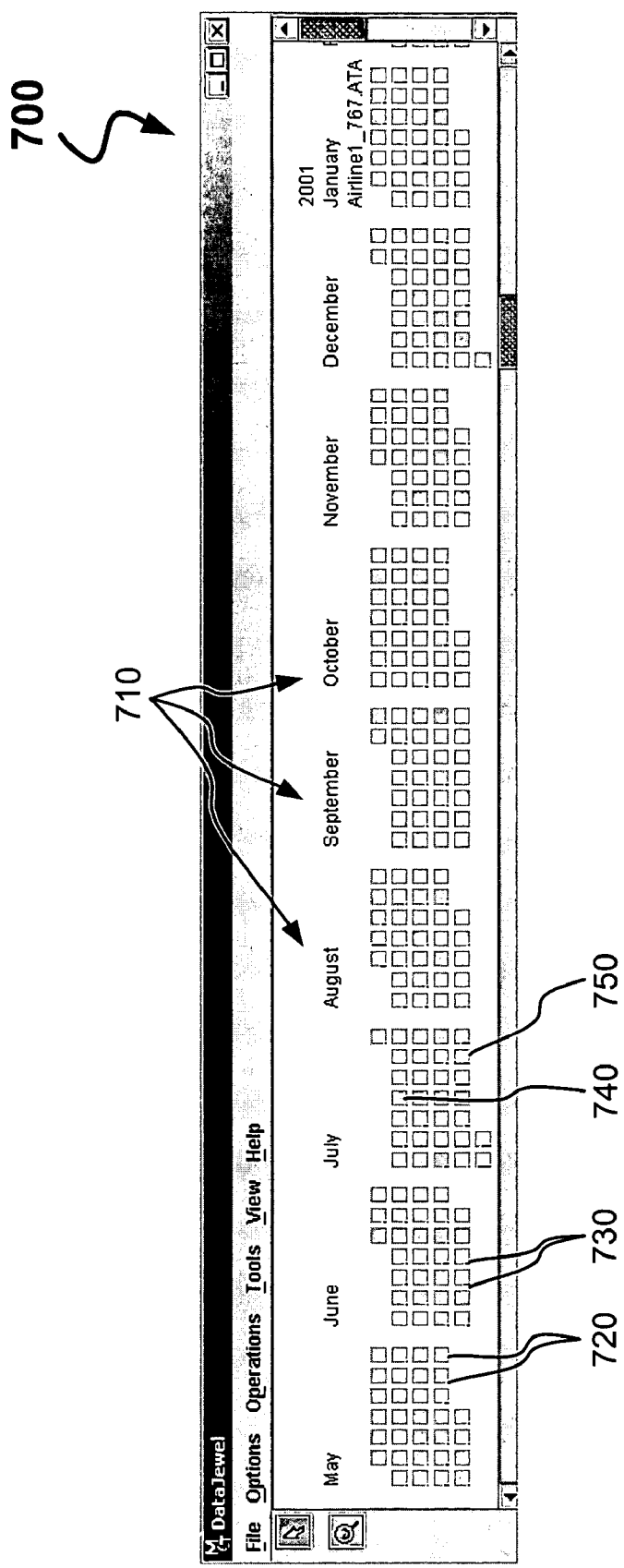
FIG. 7 is a review period including a number of months using representations of occurrences of a single type of event according to an embodiment of the present invention.

FIG. 7 is a review period 700 including a number of months 710 using representations of occurrences of a single type of event according to an embodiment of the present invention. Viewing the review period can make clear several benefits of representing data quantities according to embodiments of the present invention. At a glance, an analyst can discern days on which represented events have not occurred 720 from days on which represented events have occurred 730. Moreover, an analyst not only can determine on which days represented events have occurred 730, but the analyst also can differentiate days having low numbers of occurrences 740 from days having high number of occurrences 750. Even in a year-long view 700, analysts and researchers can discern such useful information.

Embodiments of the invention can be adapted to a variety of applications. As has been described in connection with FIGS. 4 through 7, the interval suitably includes a day. Where the interval includes a day, the period suitably includes a week wherein the days are presented in one or more week tables listing days along a first axis and days of the week along a second axis. Also, the period suitably includes a month wherein the days are presented in one or more month tables listing weeks along a first axis and days of the week along a second axis. Alternatively, the interval could be a portion of day, such as a minute or an hour, or a group of days. Correspondingly, if the interval is an hour, for example, the period could be a day.

In embodiments of the present invention, each of the number of points suitably includes at least one pixel, or can include a group of pixels. In any case, the points suitably represent occurrences and the number of points represents a number of occurrences. The number of points may literally equal the number of occurrences, or alternatively, the ratio of points to the maximum number of points may represent a relative proportion of the data quantity to a data quantity limit. Alternatively, the data quantity suitably includes a measurement, such as a longest streak of occurrences, a longest streak without recorded occurrences, a greatest deviation from an average, or any other measurement that might be associated with an interval.

Figure 2:
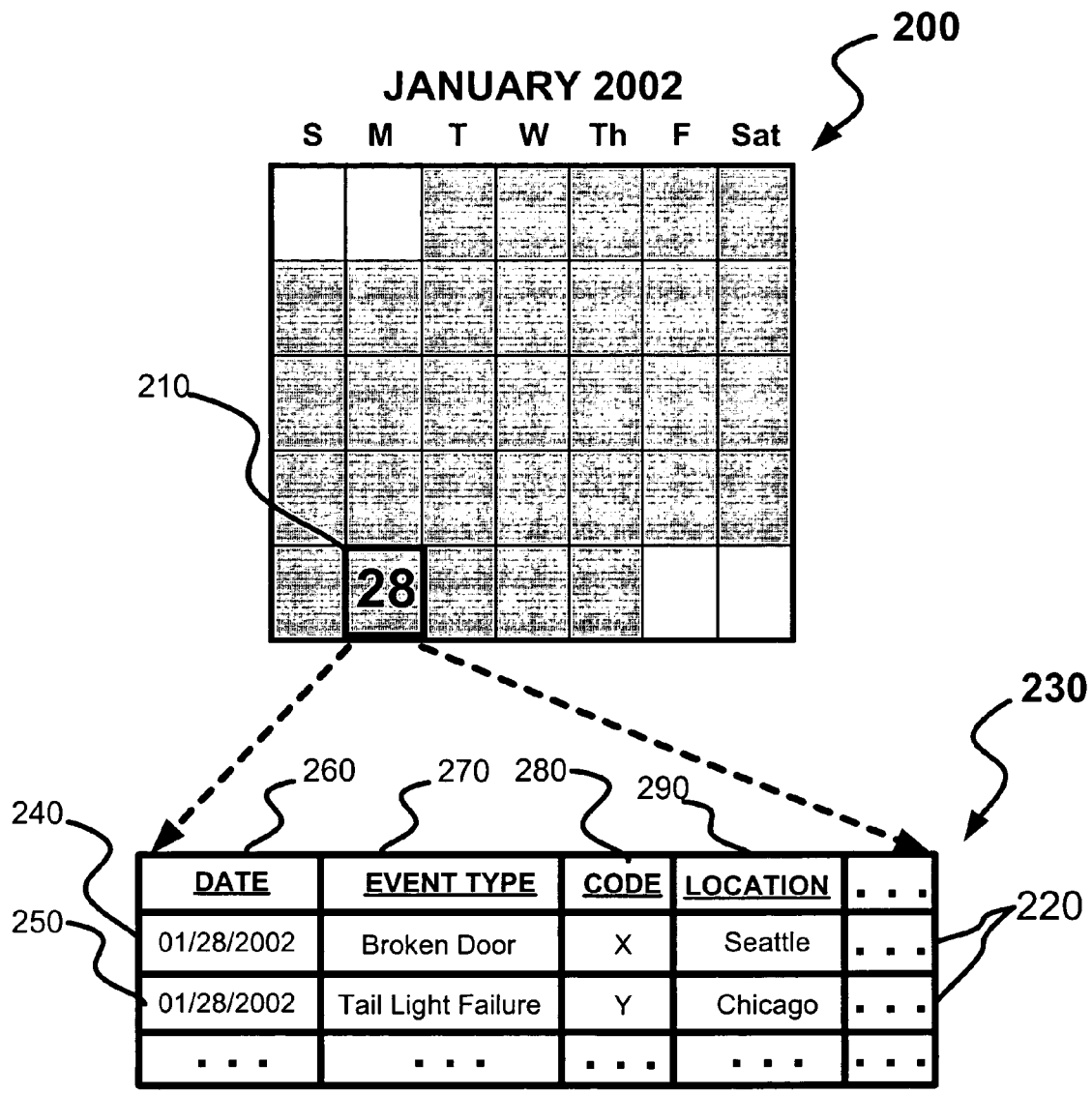
FIG. 2 is a representative month and a portion of a conventional event log for a day of the representative month.
Figure 8:
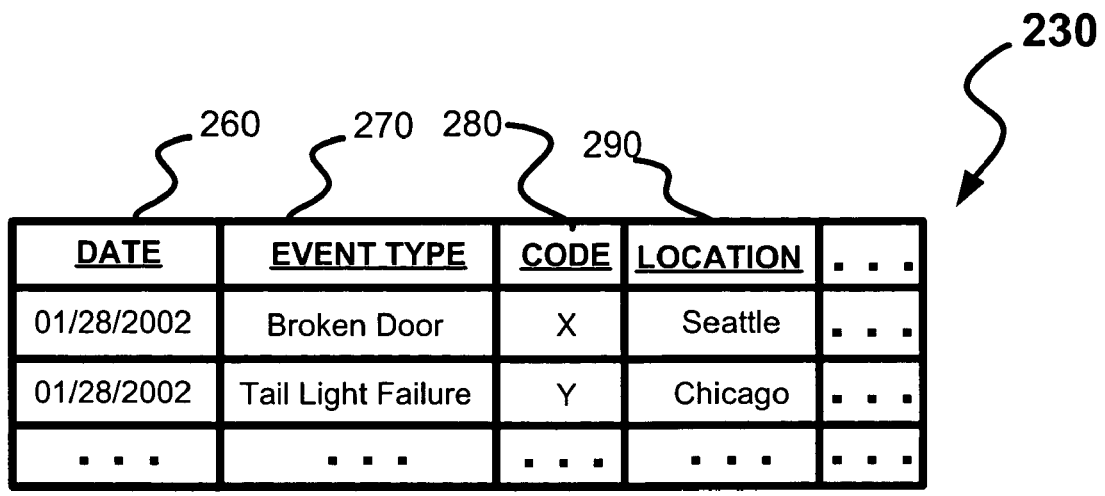
FIG. 8 is the portion of the event log of FIG. 2 and a representation of the event log according to an embodiment of the present invention for representing multiple events.
Figure 8:
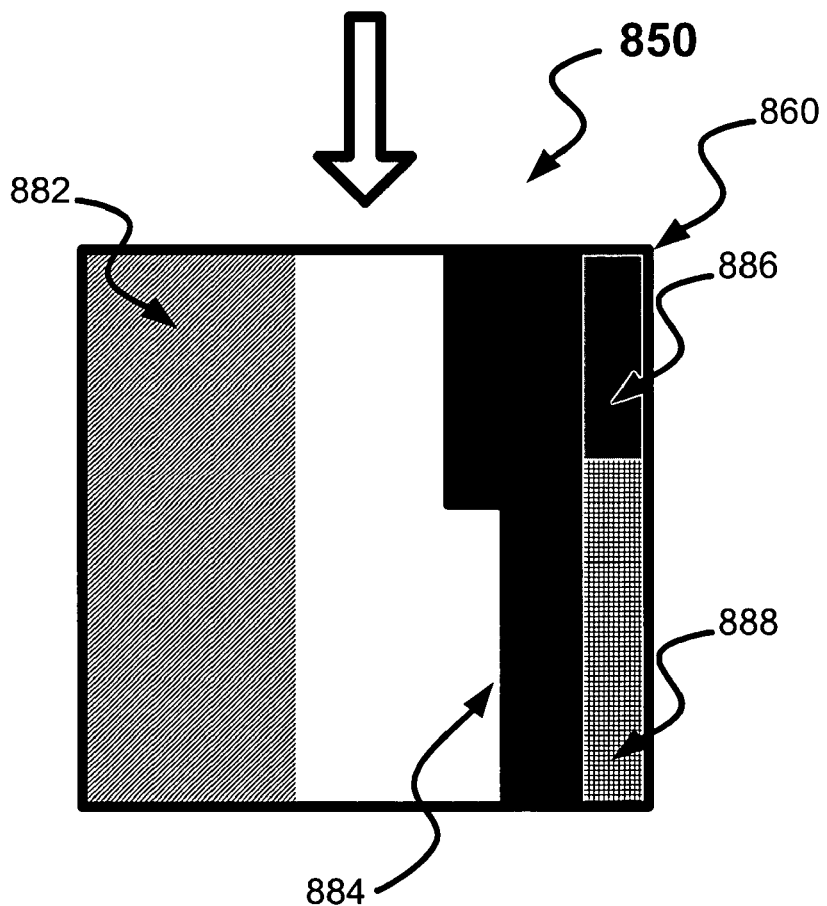

FIG. 8 is the portion of the event log 230 of FIG. 2 and a representation 850 of the event log according to an embodiment of the present invention for representing multiple events. In the example illustrated in FIG. 8, the interval is a day associated with a frame 860. In particular, the day is Jan. 28, 2002, the date 280 covered by the portion of the event log 230. The portion of the event log 230 shows events of multiple types, including "Broken Door," "Tail Light Failure," etc. As events of a single type can be illustrated in the representation 450 (FIG. 4), events of multiple types also can be illustrated.

The representation 850 shows representations of the four different event types shown in the graph 300 (FIG. 3) including door 320, engine, 330, electronics 340, and lights 350. According to one embodiment of the invention, each of the event types 320, 330, 340, and 350 is shown in a different visual format such that each event type can be visually discerned from another. The formats suitably include different colors, shades, fill patterns, or other forms of visual differentiation.

The frame 460, like the frame 860 (FIG. 4) is configured to display a maximum number of points. Each of the points suitably includes one or more pixels or another suitable subdivision of a displayable medium. Shaded areas 882, 884, 886, and 888 of the frame 860 are aggregations of a number of points used to display the data quantities being represented. The points in each of the shaded areas 882, 884, 886, 88 suitably are presented contiguously.

The data quantities represented, a number of instances logged as involving a "Broken Door," "Tail Light Failure," etc., are counted or collected from a log, database, or other data repository. The data quantities are represented as numbers of points included in the shaded areas 882, 884, 886, 888. The shaded areas 882, 884, 886, and 888 in proportion to the frame 860 as a whole represents a relative magnitude of each the data quantities being represented for the period relative to data quantity limits. The total of the data quantity limits suitably is approximately equated with a maximum number of points within the frame 860. Alternatively, because of a relative scarcity of one type of occurrence as compared to another, the data quantity limit for one type of event may be scaled relative to others to optimize visualization of the representation 850 according to desired parameters.

Figure 9:
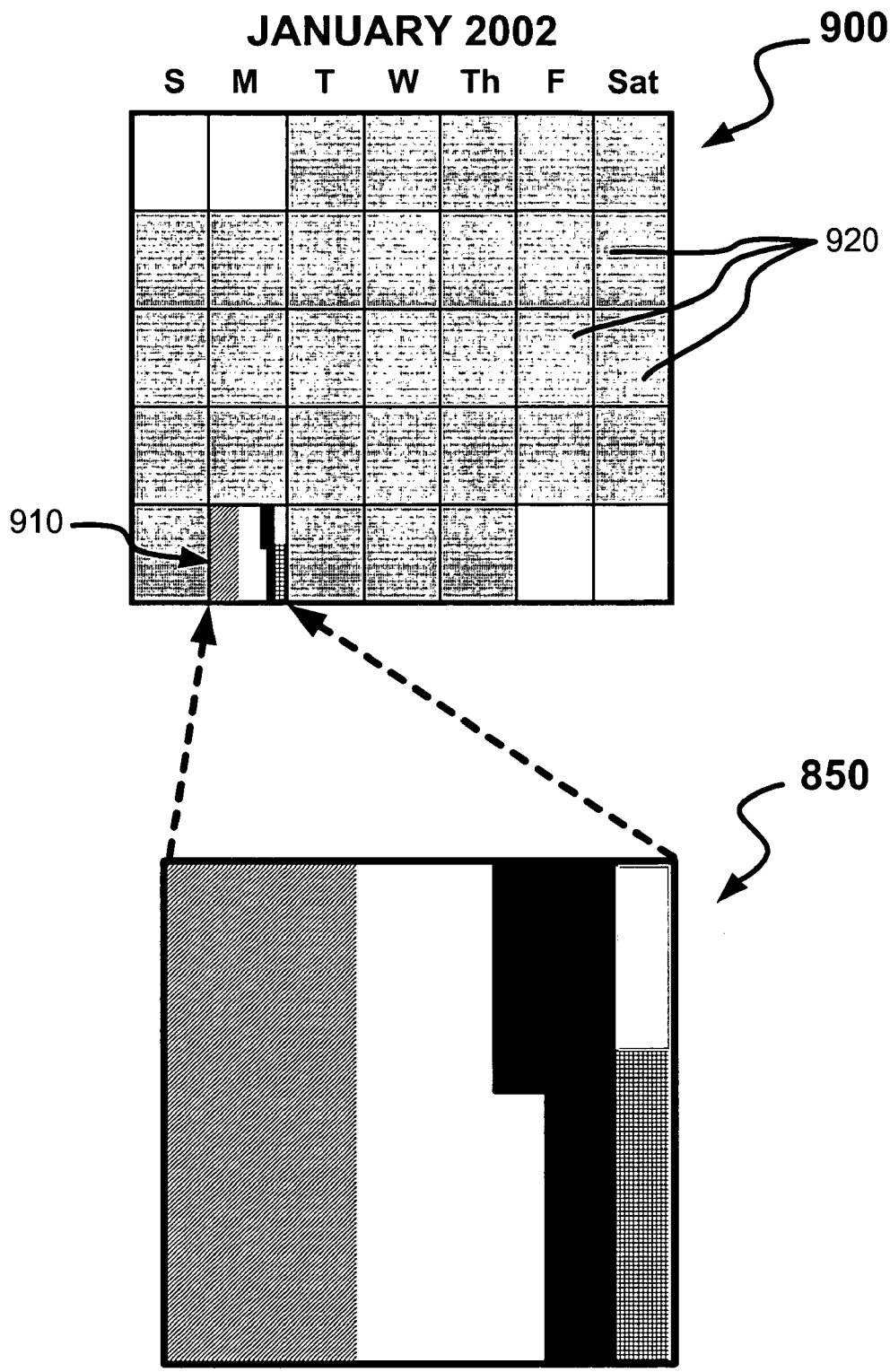
FIG. 9 is a representative month including the representation of FIG. 8.

FIG. 9 is a representative month 900 including the representation 850 of FIG. 8. The representation 850 is miniaturized to a scaled representation 910. Similar representations can be generated for each day 920 in the calendar month. As compared to the graph 300 (FIG. 3) which expresses relative magnitudes of data quantities being represented with a vertical bar, the representation 850 and its miniaturization 910 show the relative magnitudes of the data quantities in two dimensions. It will be appreciated that using both dimensions of the frame 860 (FIG. 8) makes the relative magnitudes of the data quantities represented easier to discern.

Figure 10:
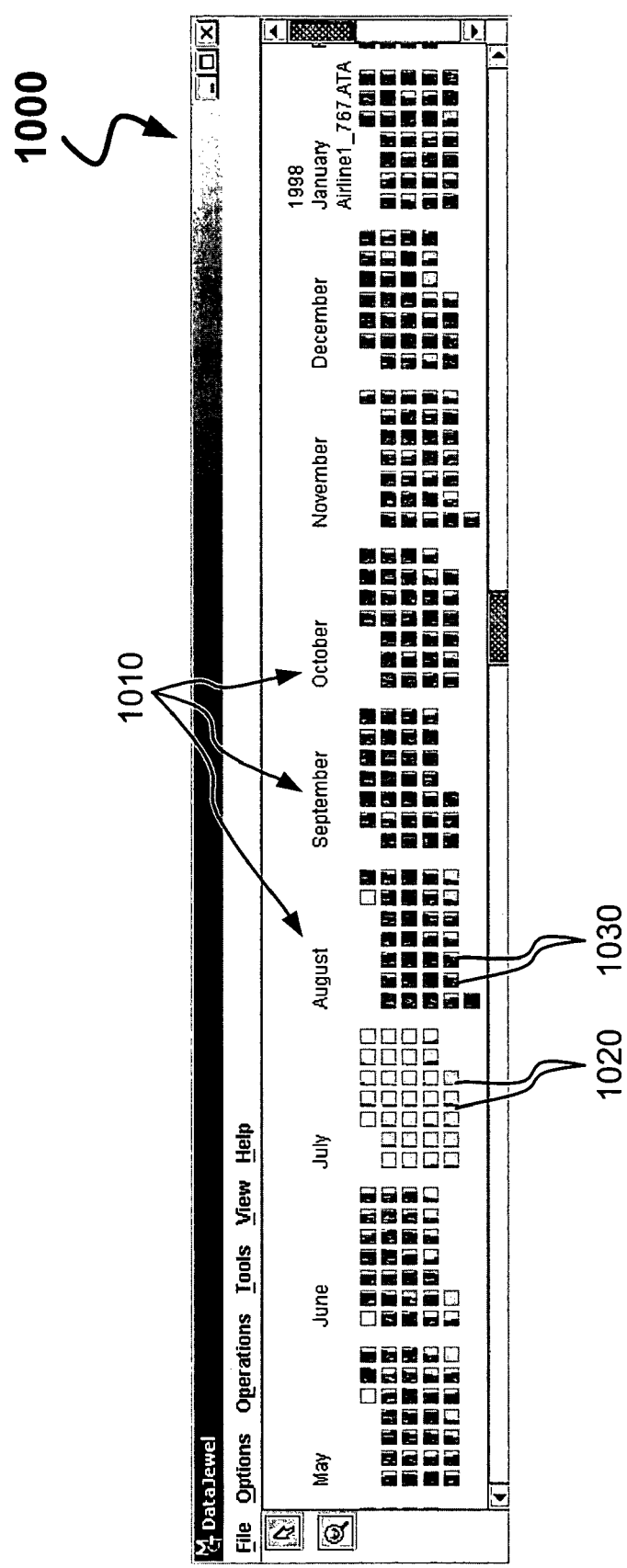
FIG. 10 is a review period including a number of months using representations of occurrences of multiple types of events according to an embodiment of the present invention.

FIG. 10 is a review period 1000 including a number of months 1010 using representations of occurrences of multiple types of events according to an embodiment of the present invention. At a glance, an analyst can discern days on which represented no or few represented events of any type have occurred 1020 from days on which represented events of many types have occurred 1030. Even in a year-long view 1000, analysts and researchers can discern such useful information for identifying trends for forensic analysis, planning, and other purposes.

It will be appreciated that the maximum number of display points suitably may be equated to a total of a first data quantity limit and a second data quantity limit. Alternatively, the portion of available points equated with, for example, a first data quantity limit and a second data quantity limit may be associated with desired proportions of the maximum number of points. It will be appreciated that embodiments of the present invention are not limited to displaying only two such data quantities. Any number of data quantities suitably are represented.

Figure 11:
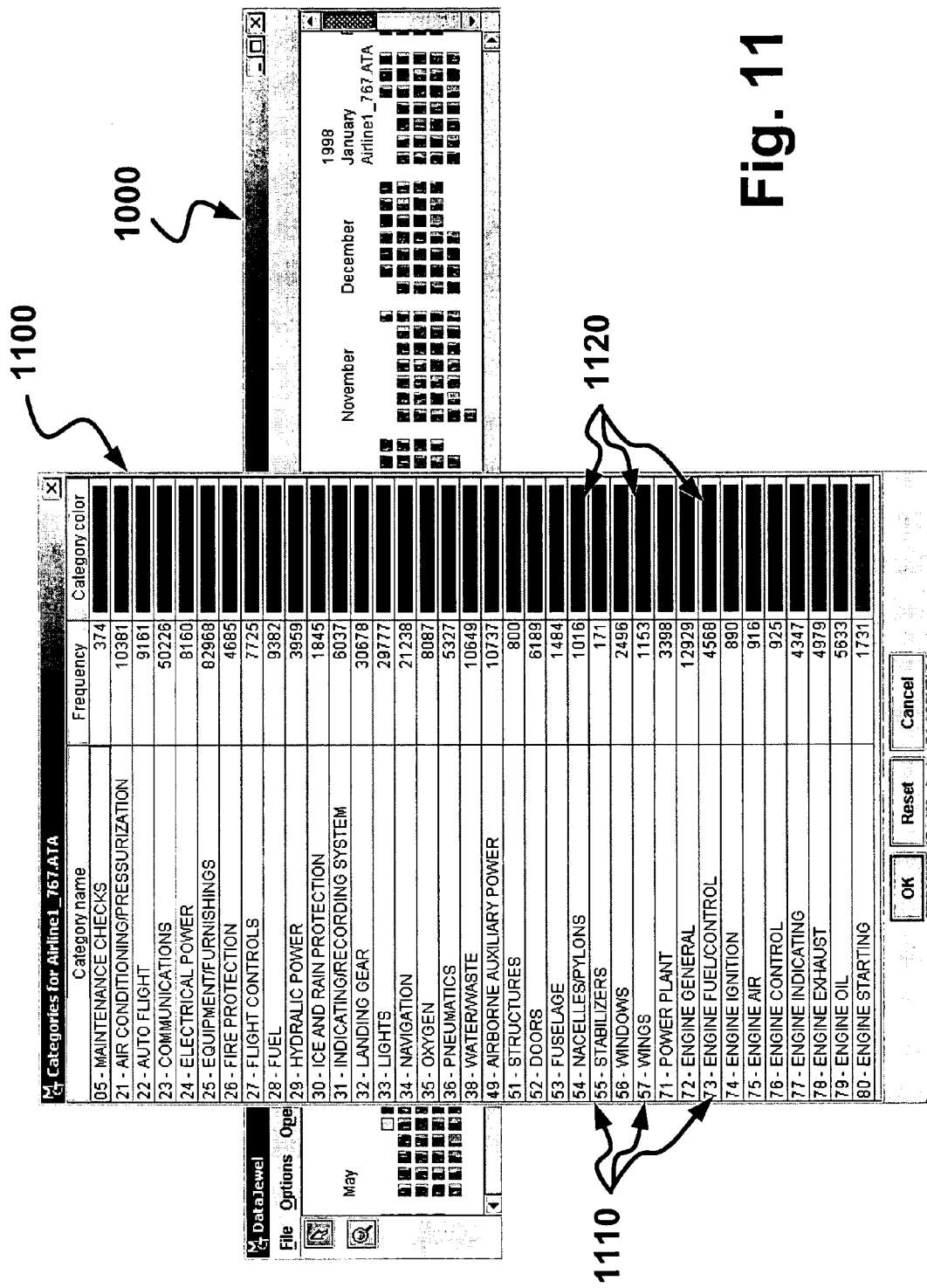
FIG. 11 is the review period of FIG. 10 and a user-interface allowing a user to assign or reassign a depiction format assigned to types of events being represented.

FIG. 11 is the review period 1000 of FIG. 10 and a user-interface 1100 allowing a user to assign or reassign a depiction format assigned to types of events being represented. In the representations collected in the review period 1000, the event types are represented by formats comprising different shades. As previously described, the formats suitably include different shades, colors, fill patterns, or other manners of visual differentiation. The user-interface associates various event types 1110 with different format types 1120. Using the interface 1100, a user can choose formats 1120 assigned to the event types 1110. Therefore, for example, if a user wants to make one particular type of event stand out, the user can assign a very different format for it from the other formats being used. For a further example, if a user wanted to aggregate events of similar types they could be assigned a single, common format. Embodiments of the present invention are not limited to any particular selection of format.

Figure 12:
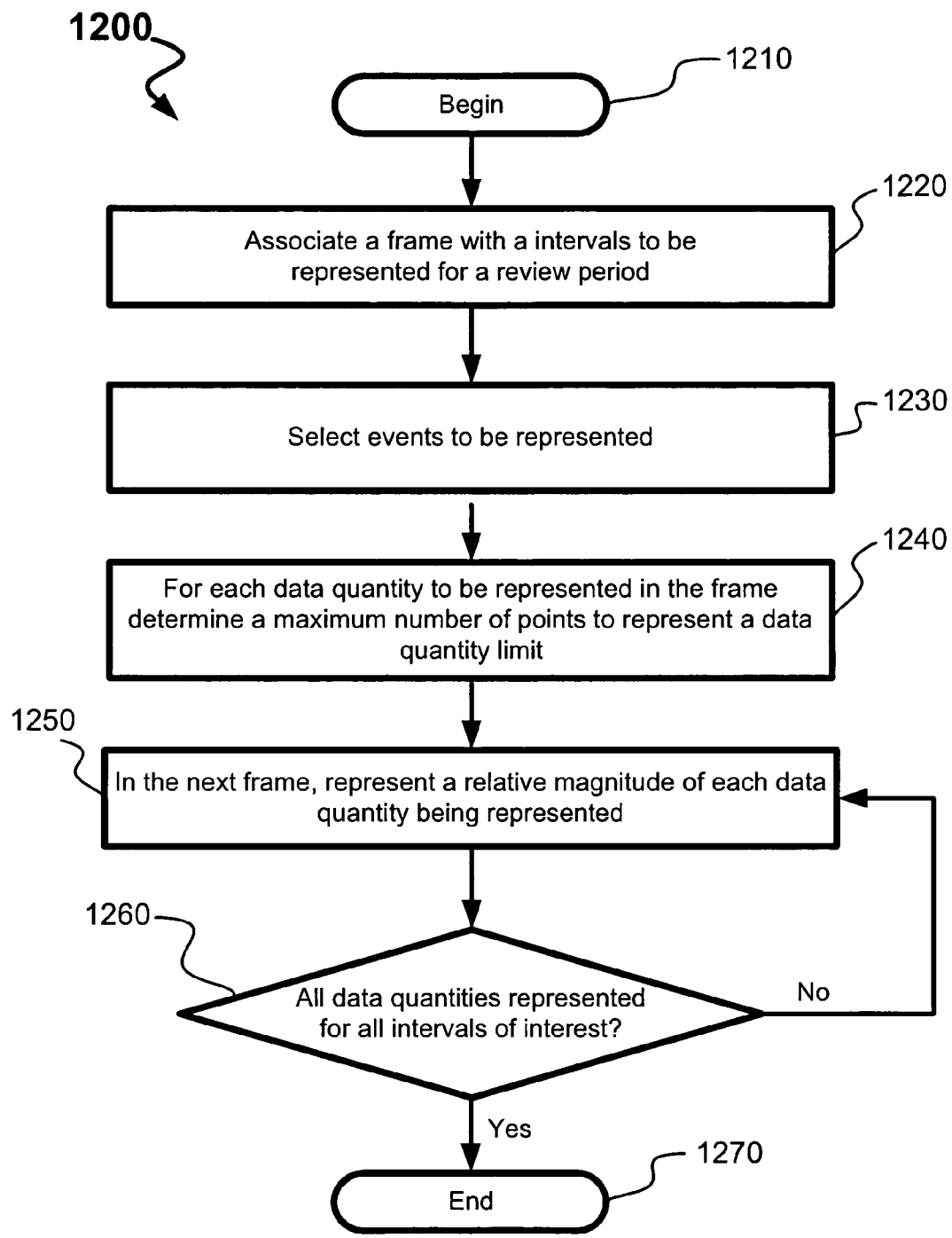
FIG. 12 is a flowchart of a routine according to an embodiment of the present invention.

FIG. 12 is a flowchart of a routine 1200 according to an embodiment of the present invention. The routine 1200 begins at a block 1210. At a block 1220 a frame is associated with intervals to be represented for a review period. At a block 1230 data quantities to be represented in the frames are selected. At a block 1240 a maximum number of points is equated with a data limit for the group of events for each data quantity to be represented. At a block 1250 in a next frame a relative magnitude of each data quantity is represented with a contiguous number of points as previously described. At a decision block 1260 it is determined if all data quantities for all intervals of interest have been represented. If not, the routine 1200 loops to the block 1250 for the data quantities to be represented in a next frame. If so, the routine 1200 proceeds to a block 1270 where the routine 1200 ends.

Figure 13:
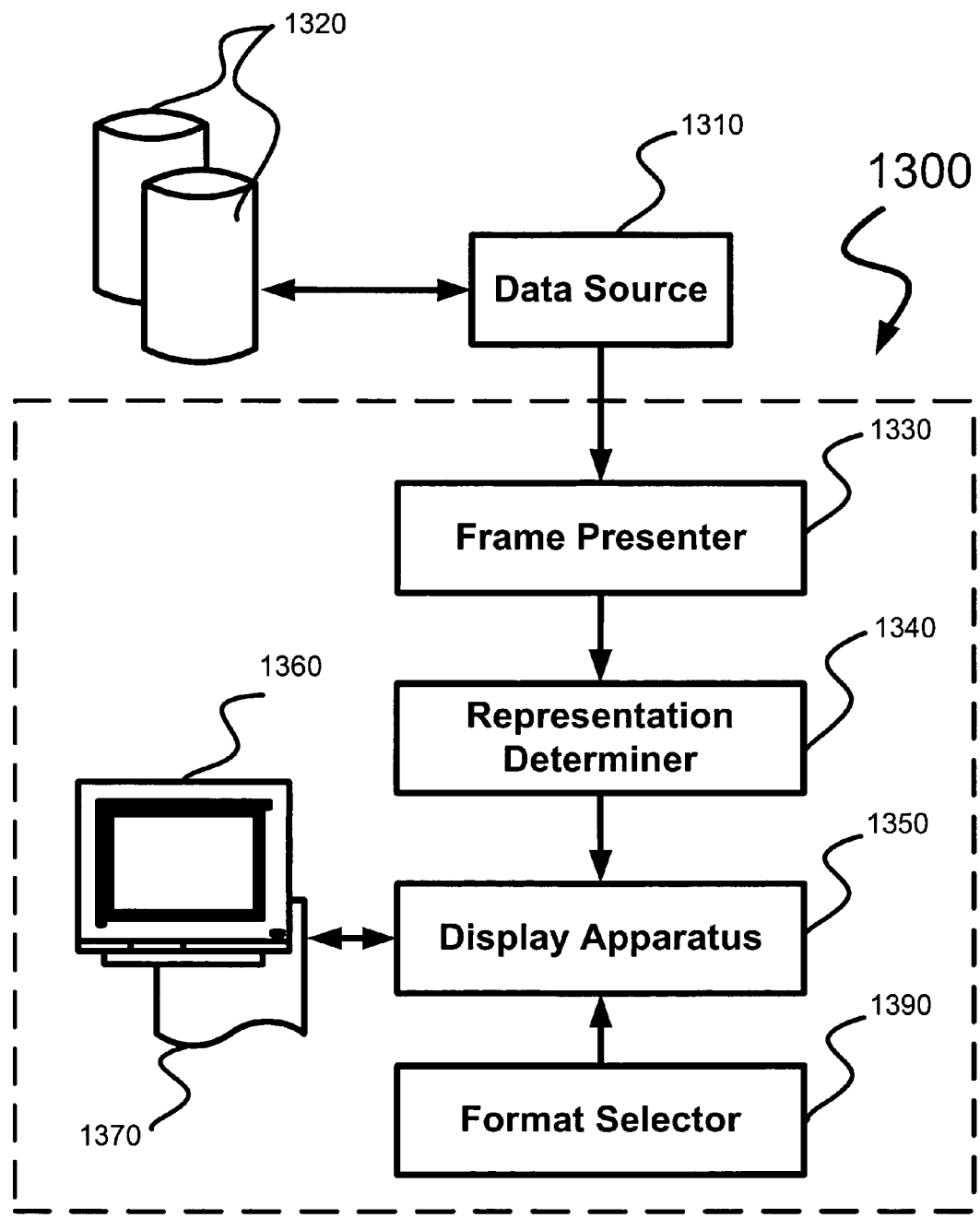
FIG. 13 is a block diagram of an exemplary system according to an embodiment of the present invention.

FIG. 13 shows a system 1300 according to an embodiment of the present invention. Information concerning data quantities is accessible from a data source 1310. The data source 1310 suitably accesses or includes data storage 1320 where the information is stored. The data source 1310 is accessed by a frame presenter 1330 configured to associate a frame with each of a number of intervals in a period of interest. The frame presenter 1330 suitably is configured to display a maximum number of points for each of the intervals. A representation determiner 1340 engages the frames and is configured to determine a number of points representative of each data quantity associable with each interval. As previously described, a proportion of the number of points to the maximum number of points represents a relative magnitude of the first data quantity. A display apparatus 1350 presents the number of points contiguously in the frames corresponding with each of the intervals. The display apparatus 1350 engages a display device 1360, an output device 1370 such as a printer, or another form of output device to present the frames to a user, analyst, or other person desiring to review the frames. In one presently preferred embodiment, a format selector 1390 provides an interface such as the interface 1100 (FIG. 11) allowing the formats to be assignable to represent the data quantities to isolate, aggregate, or otherwise support analysis of the data quantities represented.

Further embodiments of the present invention not only allow for data to be presented in a manner allowing analysts to assess data in an understandable calendar format, but may also provide for automatic identification of data characteristics of interest in time-related data. More specifically, embodiments of the present invention configured for automatic identification of data characteristics also associate frames with each of a number of intervals in a period. One or more data characteristics, such as maximums or minimums of specified types of events, longest streaks of unusual event counts, and other such data characteristics, may be identified. The data is then mined to identify significant intervals within the period for which the identified data characteristics are manifested. For the significant intervals, a representation of the data associated with the identified data characteristics may be presented.

Figure 1:
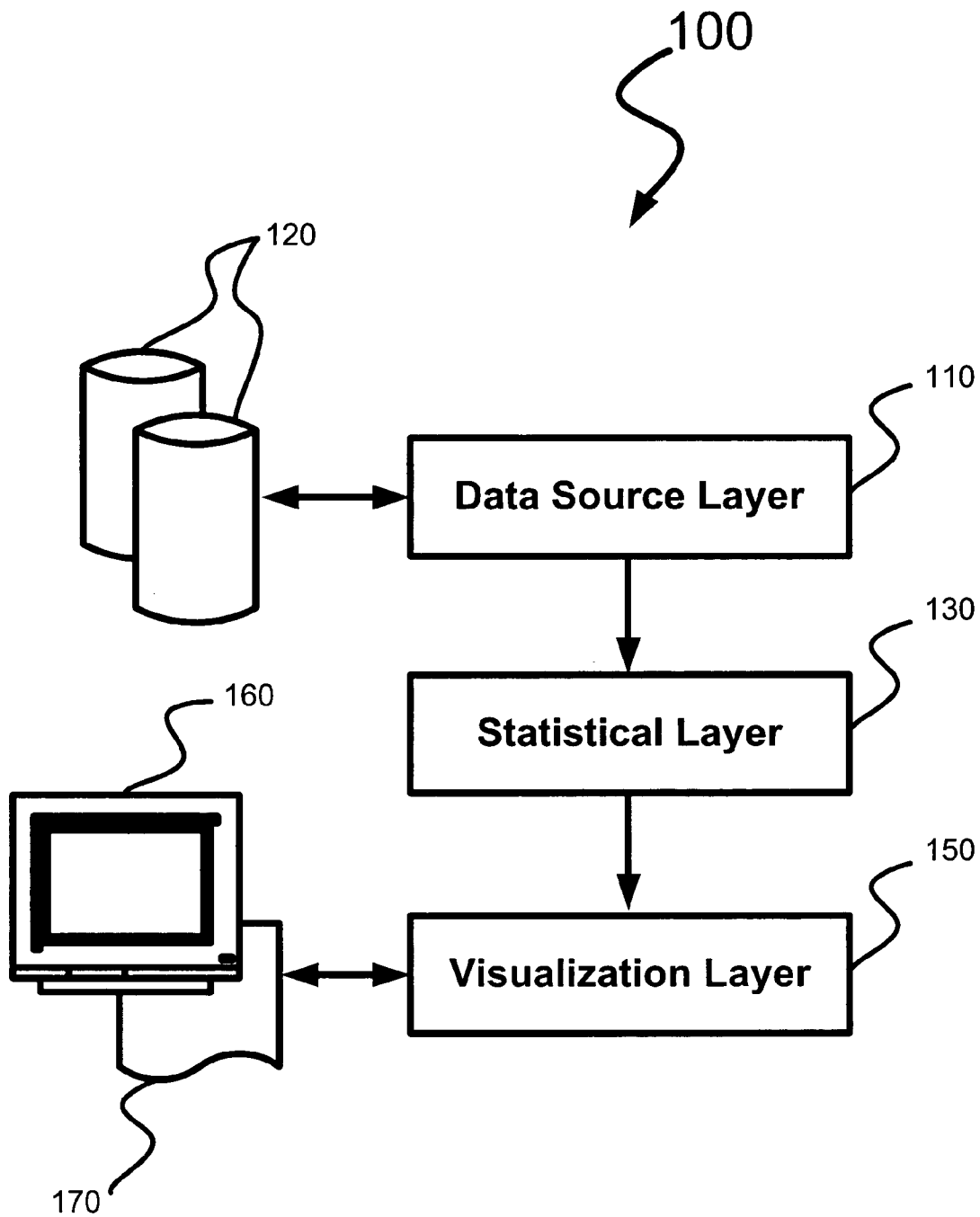
FIG. 1 is a block diagram of a conventional data system for tracking event data.
Figure 14:
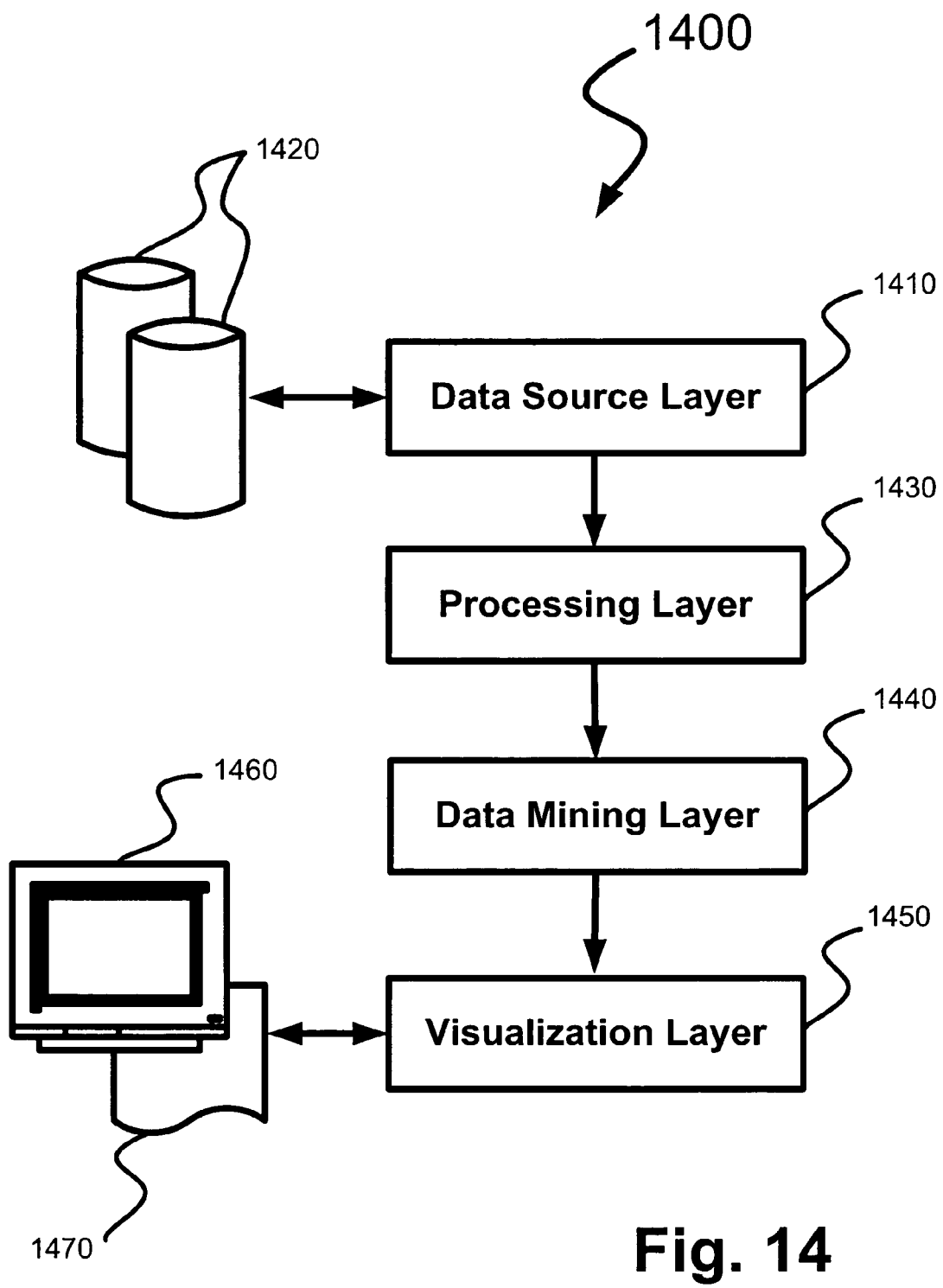
FIG. 14 is a block diagram of an exemplary system incorporating a data mining layer according to an embodiment of the present invention.

FIG. 14 is a block diagram of a system 1400 incorporating data mining to identify significant intervals for which the identified data characteristics are manifested. The system 1400 includes a data source layer 1410, a processing layer 1430, a data mining layer 1440, and a visualization layer 1450. The data source layer 1410 generally incorporates a number of data storage devices 1420 as previously described in connection with FIG. 1. The processing layer 1430 typically incorporates data-processing subsystems such as microprocessors and random access memory (RAM) devices in which operations are performed on data stored in the data source layer 1410. As previously described in connection with other embodiments of the present invention, the processing layer 1430 is operable to generate representations of data associable with the intervals. The data mining layer 1440 also operates with the data stored in the data source layer 1410 in order to identify significant intervals for which specified data characteristics are manifested in the data associated with those intervals as will be further described below. The visualization layer 1450 incorporates at least one of a display 1460 or another device, such as a printer, configured to generate printed output 1470. The visualization layer 1450 allows raw data stored in the data source layer 1410 and/or processed by the processing layer 1430 to be presented to the user for review. The information displayed may include charts or graphs selected by the user to try to evaluate the content and/or meaning of the data.

Operation of the data mining layer 1440 of the system 1410 is illustrated using an example period 1500 as shown in FIG. 15A. The period 1500 is a two-week period. The period 1500 could be of any length for which data is available or in which a user is interested. The example period 1500 selected is a two-week period for clarity of illustration. Event data for the period 1500 is plotted in a line graph 1510 of FIG. 15B. The line graph 1510 has a horizontal axis 1520 corresponding to the days representing the intervals within the period 1500. The line graph also has a vertical axis 1530 that represents a number of occurrences, a magnitude, or another measurement of interest. A curve 1540 connects values of the measurement data plotted represented on the vertical axis 1520 for each of the intervals plotted on the horizontal axis 1520.

In the non-limiting example of FIG. 15B, the measurements represented by the curve 1540 on the line graph 1510 have a mean value represented by a mean value line 1550. A standard deviation of the measurements from the mean is represented by an upper limit line 1560 and a lower limit line 1570. A mean value and standard deviation are calculable according to standard statistical methods.

It will be appreciated that the mean value line 1550 and the upper limit line 1560 and the lower limit line 1570 are shown by way of providing a non-limiting example of desirable parameters. A median value suitably is used instead of a mean. Furthermore, it will be appreciated that any other threshold, control limit, such as a minimum tolerable level or a maximum allowable level, or other values of interest could be used instead of or in addition to the mean value line 1550 or the upper limit line 1560 and lower limit line 1570 of the standard deviation. Any value of interest could be plotted along with or instead of the constant values plotted 1550, 1560, and 1570 shown in FIG. 15B.

As can be seen from the line graph 1510, the curve 1540 largely remains within the standard deviation represented by the limit lines 1560 and 1570. In accordance with an embodiment of the present invention, FIG. 15C shows a representation 1580 of the data. A darkened area 1590 corresponds with a unit of measurement for which the data exceeds the mean 1550, while a cross-hatched area 1595 corresponds with a unit of measurement for which the data is less than the mean value 1550.

The representation 1580 of FIG. 15C is a representation of all the event data for the period 1500. However, an individual seeking to evaluate the data may not wish to evaluate all the data, but only be interested in a portion of the data, such as extreme or unusual measurements. For example, in a representation 1580, the individual may wish only to see data presented for intervals outside of a standard deviation, "streaks" of intervals for which the measurements exceed a standard deviation, and other desired or unusual data measurements. For further example, if the measurements concern maintenance activity, and the data may reflect trends with regular, recurring peaks. If such regular recurring peaks can be identified, resources may be predictively allocated to correspond with such peak demands.

Figure 16:
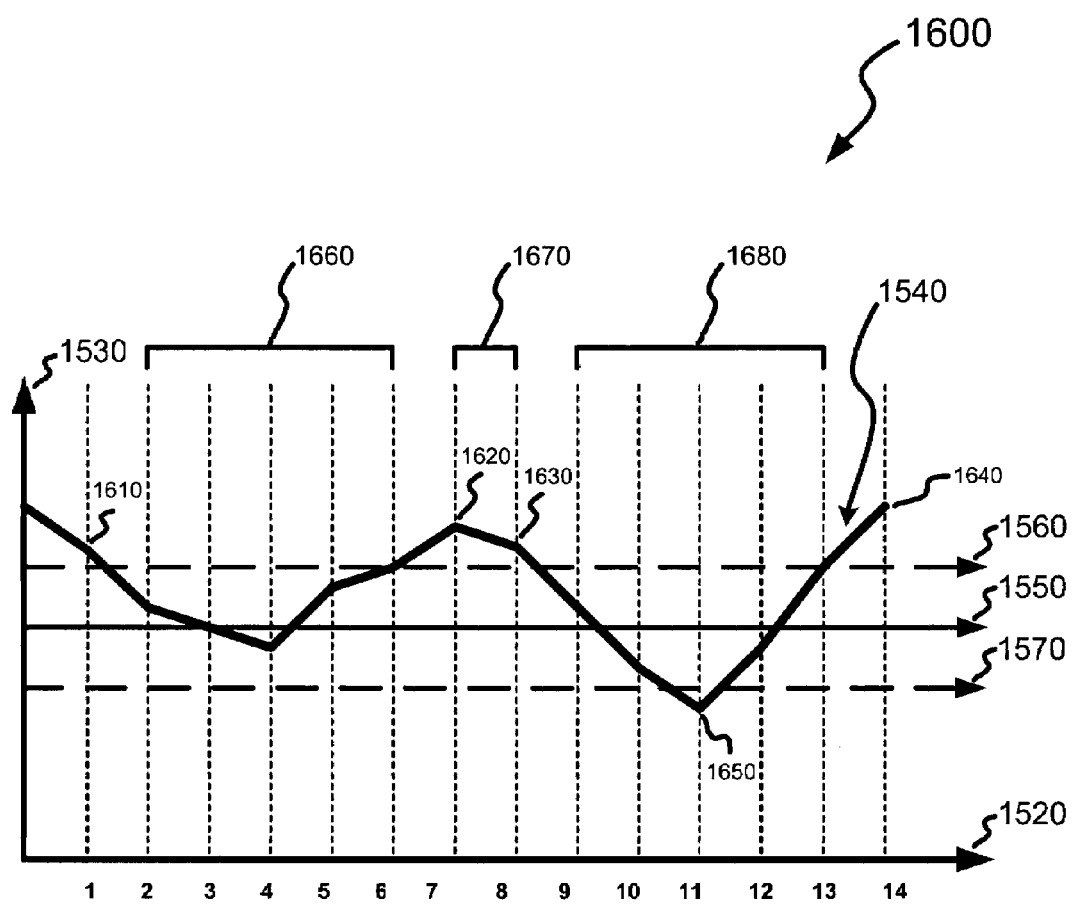
FIG. 16 is the line graph of FIG. 15B labeled to identify data characteristics of potential interest.

FIG. 16 shows a line graph 1600 which is the same as the line graph 1510 of FIG. 15B except that the line graph 1600 is labeled to identify data characteristics of potential interest. The line graph 1600 shows four data points 1610, 1620, 1630, and 1640 exceeding the standard deviation upper limit 1560 and one data point 1650 falling below the standard deviation lower limit 1570. The line graph 1600 also shows a first streak 1660 that is the longest streak for which the measurement remains within the upper limit 1560 and lower limit 1570 of the standard deviation. The line graph 1600 also shows a second streak 1670 that represents a longest streak for which the measurement exceeds the upper limit 1560 of the standard deviation. The line graph 1600 also shows a third streak 1680 that represents a streak for which the measurement does not exceed the upper limit 1560 of the standard deviation, although it does fall below the lower limit 1570 of the standard deviation.

Although these unusual or outlying data points 1610, 1620, 1630, 1640, and 1650 and streaks 1660, 1670, and 1680 can be identified from the line graph 1600, there is no evident correlation with familiar references such as a calendar. Embodiments of the present invention highlight these data characteristics and correlate them with an understandable reference framework. The data characteristics to be specifically represented suitably are selected automatically or generated in response to user selections. In the following examples, the user is provided with a choice of data characteristics and has selected the data characteristic displayed in reach representation.

Figure 17A:
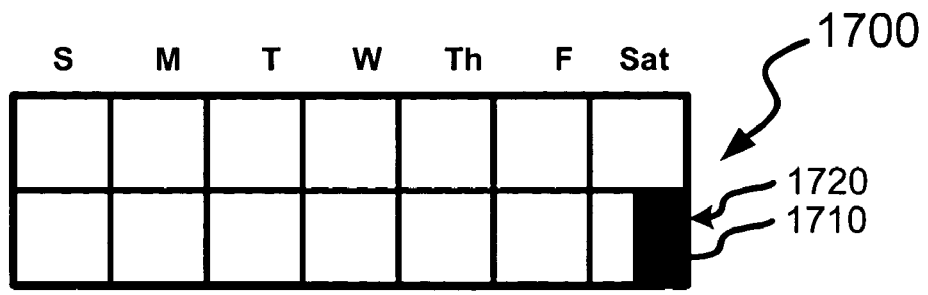
FIGS. 17A-17C are representations of the two-week period including representations of data on days where identified data characteristics are manifested.
Figure 17B:
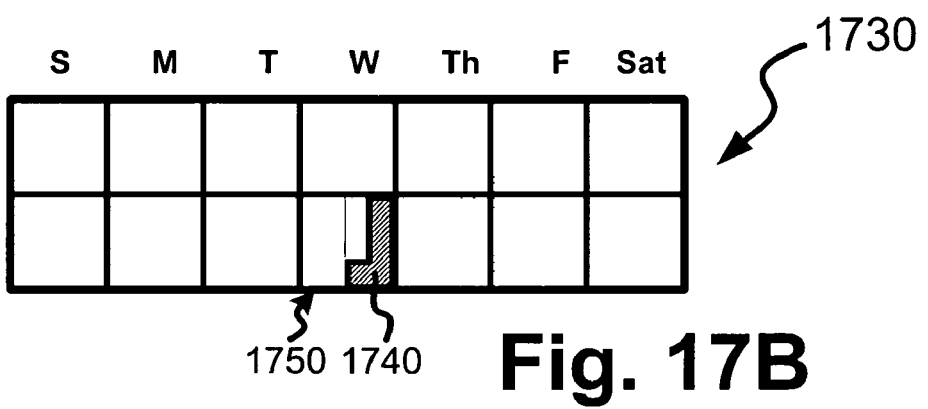
Figure 17C:
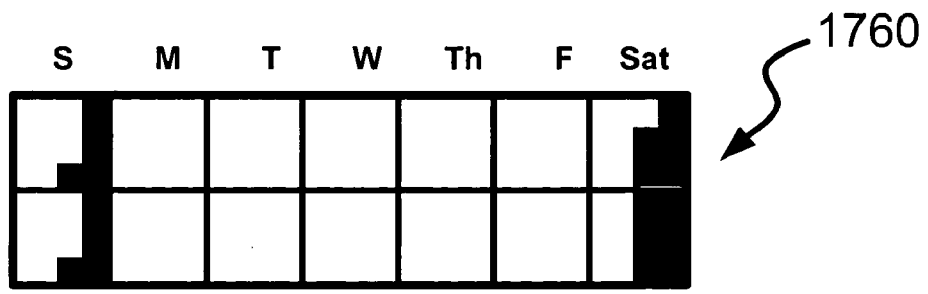

FIGS. 17A-17C are representations 1700, 1730, and 1760 of the two-week period including representations of data on days where identified data characteristics are manifested. FIG. 17A shows a representation 1700 of the period 1500 (FIG. 15A) for which a user has requested to see the maximum measurements recorded over the period 1500. Referring to FIG. 16, the point 1640 is the maximum measurement recorded over the period, recorded on day 14. In accordance with previously described embodiments of the invention, a representation 1710 of the magnitude of the measurement associated with day 14 is created and represented within the frame 1720 associated with day 14. Using the familiar calendar representation, the user can see that the maximum measurement occurred on a Saturday, and is presented with representation 1710 of the magnitude of the measurement.

FIG. 17B shows a representation 1730 of the period 1500 (FIG. 15A) for which a user has requested to see the minimum measurement recorded over the period 1500. Referring to FIG. 16, the point 1650 is the minimum measurement recorded over the period, recorded on day 11, a Wednesday. In accordance with previously described embodiments of the invention, a representation 1740 of the magnitude of the measurement associated with day 11 is created and represented within the frame 1750 associated with day 11. Using the familiar calendar representation, the user can see that the minimum measurement occurred on a weekday, and is presented with representation 1740 of the magnitude of the measurement.

From the representations 1710 and 1730, the user already might sense development of a trend in that maximum measurement was recorded on a Saturday and the minimum measurement was recorded on a Wednesday. The user also might request a representation of all the intervals for which the measurement exceeded the upper limit 1560 (FIGS. 15B and 16) of the standard deviation. FIG. 17C shows a representation 1760 of intervals for measurements exceeding the upper limit 1560 of the standard deviation. From this representation 1760, the user can discern that all such measurements were recorded on weekend days. By contrast with the representation 1580 of FIG. 15C, the user can perhaps even more readily identify the peak measurement intervals in the representation 1760 of FIG. 17C.

Figure 18A:
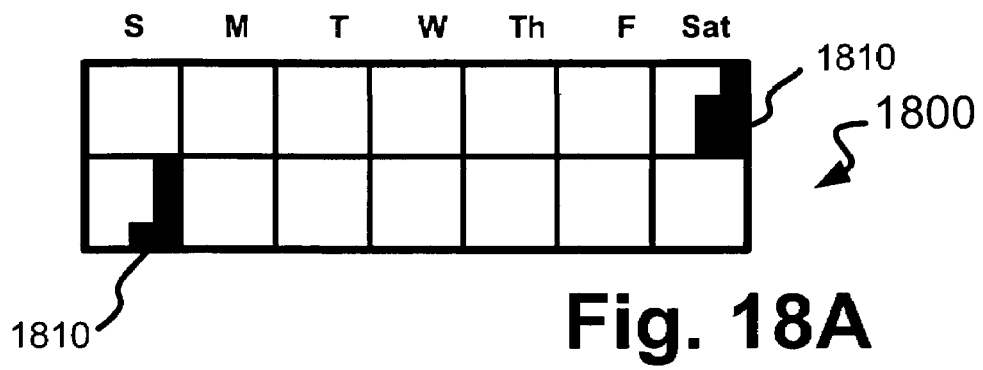
FIGS. 18A-18C are representations of the two-week period including representations of data for intervals for which identified data characteristics are manifested.
Figure 18B:
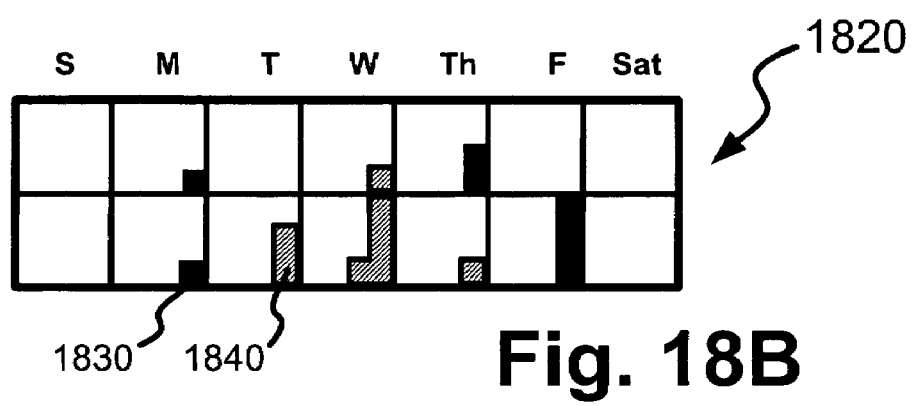
Figure 18C:
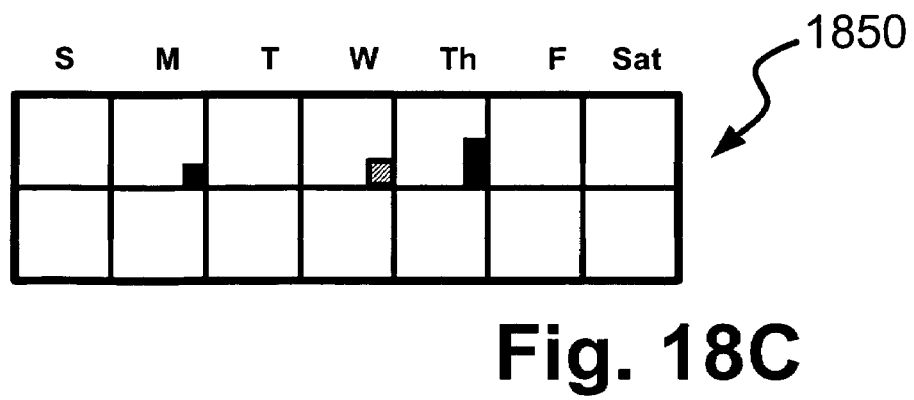

Embodiments of the present invention not only can identify data characteristics for individual interval, but also can identify consecutive intervals in which one or more data characteristics of interest are manifested, resulting in "streaks" of potential interest. For example, FIGS. 18A-18C are representations of the two-week period including representations 1800, 1820, and 1850 of data for identified streaks of data characteristics. Representations 1810 of the relative magnitude of the measurement for each interval are included as previously described.

For the two-week period 1500 (FIG. 15A), if the user wishes to have presented the longest streak for which data exceeded the upper limit 1560 (FIGS. 15B and 16) of the standard deviation, the representation 1800 would be generated. The representation includes the two-day streak 1660 of days 7 and 8 that, as seen from the line graph 1600, includes points 1620 and 1630 falling on consecutive days and thus constituting the longest such streak. Embodiments of the present invention identify such streaks, display representations of the relative magnitudes of the measurements for the identified intervals, and present the representation 1800 in a familiar calendar format.

Alternatively, if the user wished to have presented the longest streak for which data did not exceed the upper limit 1560 (FIGS. 15B and 16) of the standard deviation, the representation 1820 would be generated. The representation includes the streak 1670 of days 2, 3, 4, 5 and 6 and the streak 1680 of days 9, 10, 11, 12, and 13. As shown in the representation 1700 and 1720 (FIGS. 17A and 17B, respectively), measurements exceeding the mean 1550 (FIGS. 15B and 16) are represented with a solid shaded area 1830 while measurements falling below the mean 1550 are represented with a cross-hatched area 1840. It will be appreciated that the same shading, coloring, or fill pattern could be used for both measurements above and below the mean 1550 if variation were the only aspect of interest.

If the user is interested in longest streaks for which the data did not exceed either the upper limit 1560 or the lower limit 1570 (FIGS. 15B and 16) of the standard deviation, the representation 1850 would be generated. The representation includes the streak 1670 of days 2, 3, 4, 5, and 6 only because the streak 1680 of days 9, 10, 11, 12, and 13 on day 11 fell below the lower limit 1570 of the standard deviation. Accordingly, embodiments of the present invention are configurable to identify data characteristics to whatever degree of specificity is desired.

Comparing the representations 1700, 1730, 1760, 1800, 1820, and 1850 with the line graph 1510 (FIG. 15B) illustrates benefits of the representations created using embodiments of the present invention. Whatever the phenomenon or phenomena being measured in these representations, the higher and highest measurements and streaks of measurements exceeding the upper limit 1560 (FIGS. 15B and 16) standard deviation occur on the weekends. The lower measurements and streaks not exceeding the upper limit 1560 of the standard deviation occur on weekdays. Thus, for example, in the case of maintenance events, it is readily apparent from the representations that requirements for maintenance resources are higher on weekends than on weekdays, and resources should be allocated or reallocated accordingly. From the line graph 1510, the correlation with weekends is not self-evident.

Embodiments of the present invention offer advantages not only in highlighting intervals for which one or more specified data characteristics are manifested, but also advantageously can identify one or more sets of data that meet specified data characteristics. Generally, for example, if data is logged for multiple types of events or data relating to a single type of event for different people or systems are logged, embodiments of the present invention suitably identify the people, events, or other source for which one or more specified data characteristics are manifested. In identifying and isolating a particular source of such events, for example, relatively troublesome or trouble-free entities can be identified for review.

Figure 19A:
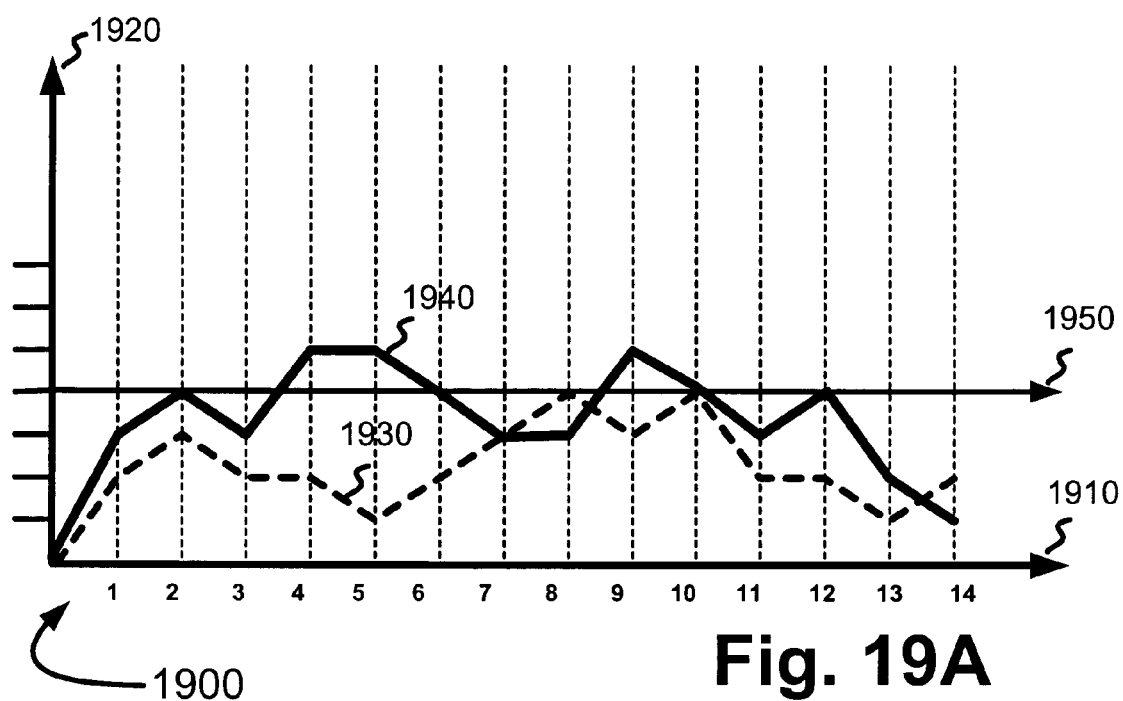
FIG. 19A is a line graph for two sets of events logged for a two-week period.
Figure 19B:
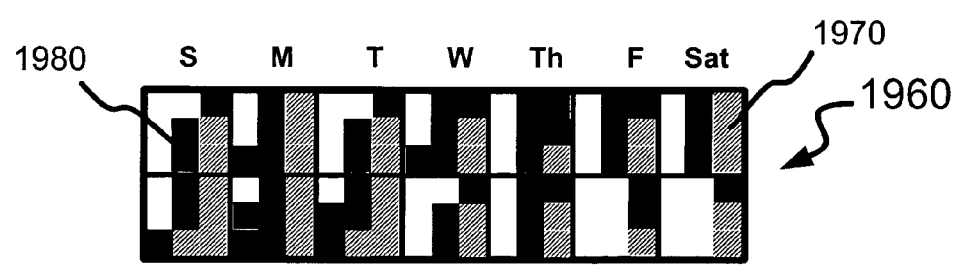
FIG. 19B is a representation of the two-week period including representations of the two sets of events occurring during that period according to an embodiment of the present invention.

FIG. 19A is a line graph 1900 for two sets of events logged for a two-week period comparable to FIG. 15B. The line graph 1900 has a horizontal axis 1910 corresponding to the days representing the intervals within the period. The line graph 1900 also has a vertical axis 1920 that represents a number of occurrences, a magnitude, or another measurement of interest. A first curve 1930 connects values of a first set of measurement data represented on the vertical axis 1920 for each of the intervals plotted on the horizontal axis 1910. A second curve 1940 connects values of a second set of measurement data represented on the vertical axis 1920 for each of the intervals plotted on the horizontal axis 1910. For purposes of this example, it is assumed that the curves 1930 and 1940 plot a same type of maintenance event for two different systems over a same two-week period. As can be seen from the graph 1900, the second curve 1940 shows that the system it represents generally exhibits a higher number of events. A parameter limit 1950 plots a value of an exemplary threshold limit of interest, a warning threshold, or another value of interest relative to the curves 1930 and 1940. In accordance with an embodiment of the present invention, FIG. 19B shows a representation 1960 of the data. Cross-hatched areas 1970 represent events associated with the first curve 1930 (FIG. 19A), while solid-darkened areas 1980 represent events associated with the second curve 1940.

Figure 20A:
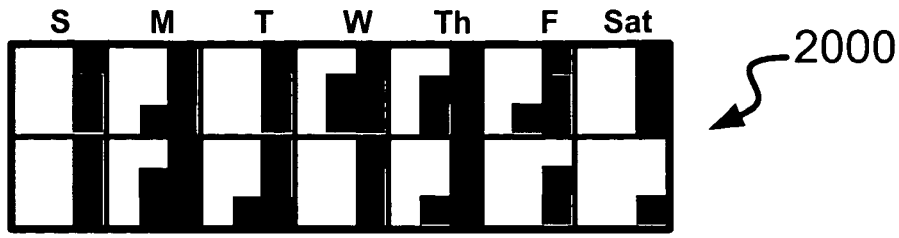
FIGS. 20A-20E are representations of the two-week period including representations of data for intervals for which identified data characteristics are manifested.

FIG. 20A-20E are different representations of the two-week period to isolate events of interest. A user may specify different data characteristics of interest, and an embodiment of the present invention suitably identifies the data representations for appropriate intervals for which the specified data characteristic is manifested. In mining the data to identify and represent the data associated with the data characteristics, embodiments of the present invention identify and isolate events of potential interest for users and others interested in the data being represented. FIG. 20A shows a representation 2000 that would be generated in response to a request for data for the system having the highest number of events exceeding the parameter limit 1950 (FIG. 19A). As a result, the representation 2000 shows only the events for the second system whose data is represented by the second curve 1940 (FIG. 19A). Comparing FIG. 20A with FIG. 19B, the representations 2000 and 1960, respectively, illustrates that isolating a data set of potential interest allows a user to focus on a view of data of particular interest. For example, the user can focus on the peak days or trends of one of the data sets without having consciously to disregard other representations that appear in the frames for multiple sets of events.

Figure 20B:
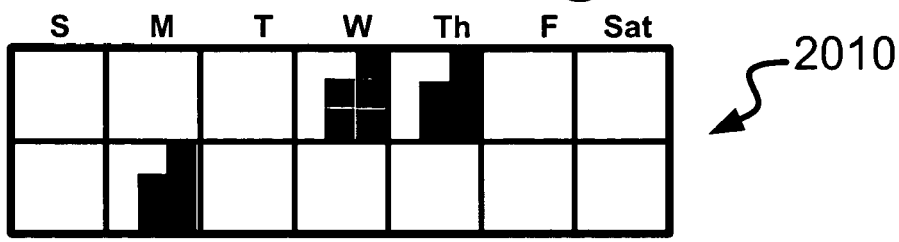

Embodiments of the present invention not only advantageously isolate particular data sets, but further advantageously can identify salient intervals or sets of intervals for data sets of interest. FIG. 20B shows a representation 2010 for intervals in which a number of events logged has exceeded the parameter limit 1950 (FIG. 19A). The representation 2010 shows that only the system whose data meets the specified data characteristic is the second system whose data is represented by the second curve 1940. Accordingly, embodiments of the present invention advantageously facilitate identification of a potential concern.

Considering embodiments of the invention explained in connection with FIGS. 17A-C and FIGS. 18A-18C, embodiments of the present invention are useful not only for identifying sets of data meeting specified data characteristics, but also are useful for identifying peak events, longest streaks of a particular type, and other data characteristics. Embodiments of the present invention allow for combining these features to identify data of interest for particular data sets and particular aspects of those data sets.

Figure 20C:
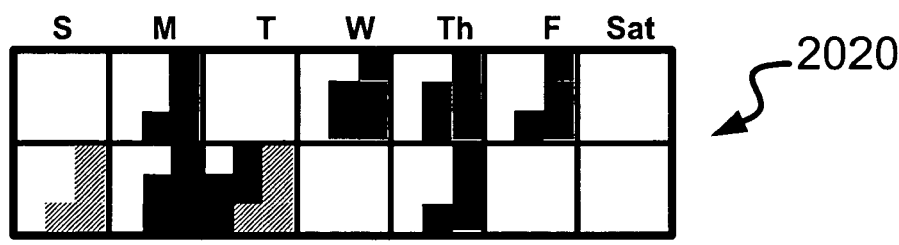
Figure 20D:
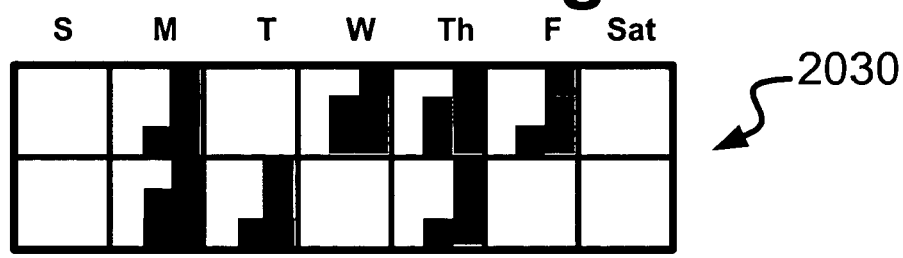

FIGS. 20C-20D show data representations 2020 and 2030 showing how representations are generated to meet various data characteristic requests. FIG. 20C shows a representation 2020 for all events that meet or exceed the parameter limit 1550 (FIG. 19A). The representation 2020 thus shows data from both the first system and the second system because, as shown in the line graph 1900, both systems at least reached the parameter limit. If a user is interested only in a data representation for one of the systems, such as the second system, the user can specify this data characteristic. The representation 2030 of FIG. 20D shows the resulting representation.

Figure 20E:
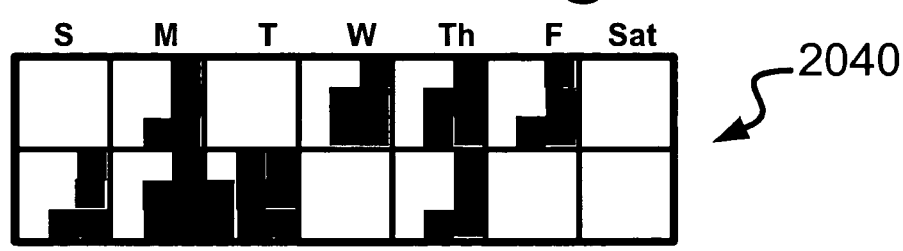

FIG. 20E illustrates another aspect of embodiments of the present invention. A user may be interested in a total events of a particular type meeting a data characteristic such as those represented in the line graph 1950 (FIG. 19A). To take just one example, the user may be interested in seeing a total representation of all events for all systems when each system has at least met the parameter limit. A representation 2040 shows this representation. As compared with the representation 2020 (FIG. 20C), it can be seen that the representation 2040 includes a total number of event shown for each interval in the representation 2020. A difference is that events from both systems represented are shown in a same color, pattern, or other form to make stand out the total event count meeting the specified data characteristics.

Figure 21:
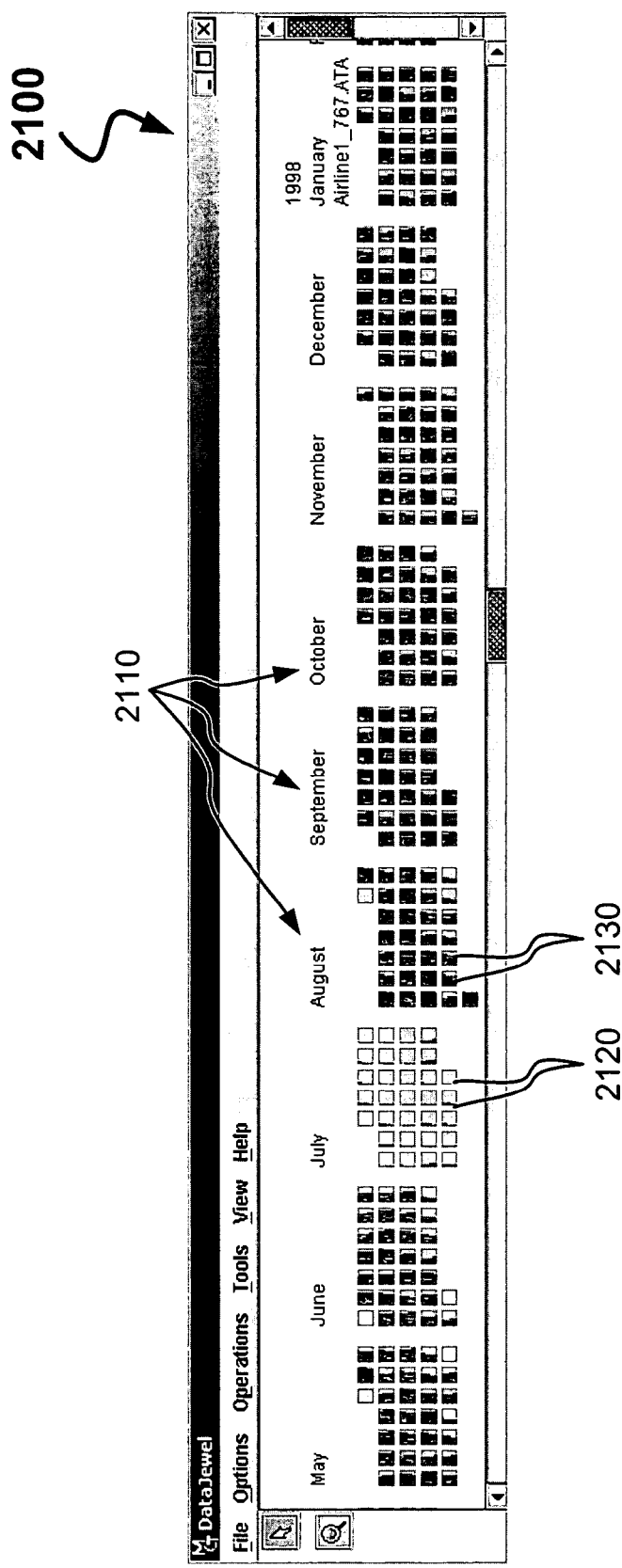
FIG. 21 is a review period including a number of months using representations of occurrences of multiple types of events according to an embodiment of the present invention.
Figure 22:
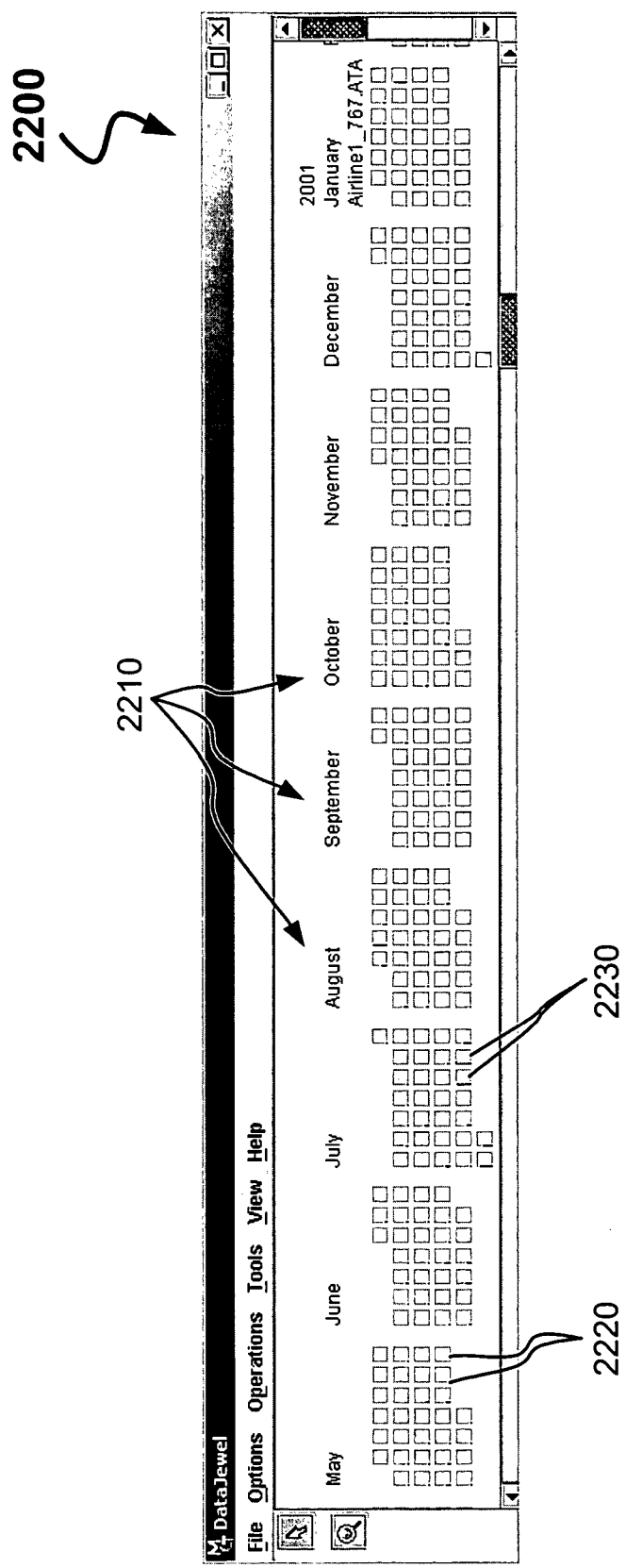
FIG. 22 is a review period including a number of months showing representations of identified data characteristics according to an embodiment of the present invention.

A benefit of such a system can be discerned by comparing FIGS. 21 and 22. FIG. 21 shows a representation 2100 spanning a number of months 2110. As can be seen from the representation, multiple sets of data are represented in different patterns. For intervals where few events are represented, such as intervals 2120, it may be easy to differentiate an individual type of event. By contrast, where many types of data are represented in intervals such as intervals 2130, it may be more difficult to identify trends or data types of interest.

Embodiments of the present invention allow a user to specify that certain types should be aggregated and shown in a common format so that they stand out, while any other data represented can be omitted or merged into a different color. Representation 2200 of FIG. 22 shows such a representation. The representation 2200 also spans a number of months 2210. The user specifies a data characteristic of interest and those events are grouped and commonly presented. Accordingly, some intervals may show no data meeting the specified data characteristic, such as intervals 2220. By contrast, intervals where such aggregated events are represented stand out, such as in intervals 2230. Making such intervals 2230 stand out facilitates review and analysis of the data.

Figure 23:
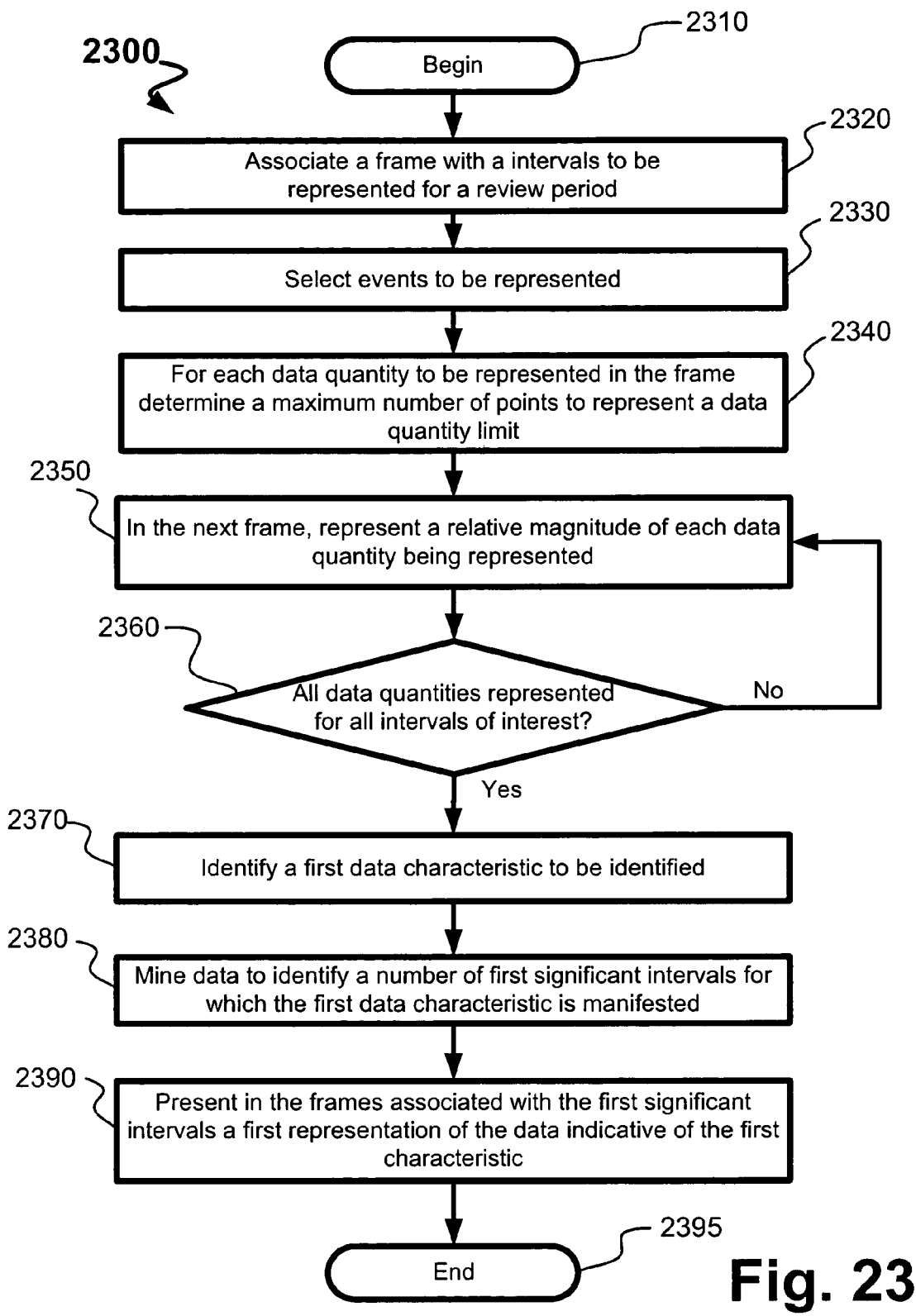
FIG. 23 is a flowchart of a routine according to an embodiment of the present invention.

FIG. 23 is a flowchart of a routine 2300 according to an embodiment of the present invention in which all event data is represented, then a user can identify particular data characteristics that may be of interest. The routine 2300 begins at a block 2310. At a block 2320 a frame is associated with intervals to be represented for a review period. At a block 2330 data quantities to be represented in the frames are selected. At a block 2340 a maximum number of points is equated with a data limit for the group of events for each data quantity to be represented. At a block 2350, in a next frame a relative magnitude of each data quantity is represented with a contiguous number of points as previously described. At a decision block 2360 it is determined if all data quantities for all intervals of interest have been represented. If not, the routine 2300 loops to the block 2350 for the data quantities to be represented in a next frame.

On the other hand, once all the data has been represented, the routine 2300 proceeds to a block 2370 where a first data characteristic is identified. At a block 2380 the data is mined to identify a first number of intervals that are significant. Significant intervals are those for which the first data characteristic is manifested in data associated with the intervals. At a block 2390, for the first significant interval a representation of the relative magnitude of the data is presented in the frame associated with each significant interval. Once the significant intervals have been displayed, the routine 2300 ends at a block 2395.

Alternative aspects of the present invention allow for the data characteristic to be identified before any representations are presented in the frames. Also, multiple data characteristics could be simultaneously represented to study different phenomena, to determine if the multiple data characteristics interrelate, or for other reasons. Similarly, the routine 2300

(FIG. 23) could repeat allowing a user to repeatedly choose to identify different or additional data characteristics to be represented. As previously described, embodiments of the present invention include specification of a data characteristic allowing events to be aggregated and commonly represented to facilitate identification of data of potential interest.

While preferred and alternate embodiments of the invention have been illustrated and described, as noted above, many changes can be made without departing from the spirit and scope of the invention. Accordingly, the scope of the invention is not limited by the disclosure of the preferred and alternate embodiments. Instead, the invention should be determined entirely by reference to the claims that follow.

What is claimed is:

1. A method for representing data associable with intervals, the method comprising:

associating a frame with each of a number of intervals in a period;

identifying a first data characteristic to be identified for data associable with the number of intervals in the period, the first data characteristic being based on a variation from an expected quantity;

mining the data associable with the number of intervals in the period to identify a number of first significant intervals, the first significant intervals being intervals for which the first data characteristic is manifested in data associated with each of the first significant intervals; and presenting in the frame associated with each of the first significant intervals a first representation of the data indicative of the first data characteristic, wherein the frame comprises a rectangular area and wherein the first representation comprises one or more rectangular columns adjacently disposed within at least a portion of the rectangular area, the one or more rectangular columns having a first visual characteristic.

2. The method of claim 1, wherein the first representation comprises a perimeter boundable by a pair of contiguous rectangles, the pair of contiguous rectangles including a first rectangle and a second rectangle having a different area than the first rectangle.

3. The method of claim 1, wherein each interval includes a day and the period includes at least one week such that the frames are presented in a week table having days listed along a first axis and days of a week listed along a second axis.

4. The method of claim 1, wherein each interval includes a day and the period includes at least one month such that the frames are presented in a month table having days of a week listed along a first axis and at least one week listed along a second axis.

5. The method of claim 4, wherein the interval includes a day and the period includes at least one year such that the frames are presented in a plurality of month tables.

6. The method of claim 1, wherein mining the data includes identifying at least one streak having a plurality of adjacent first significant intervals.

7. The method of claim 1, wherein the expected quantity includes at least one of an expected number, an expected range, a control limit, and a standard deviation.

8. The method of claim 6, further comprising:

identifying a second data characteristic for time-related data based on a second variation from the expected quantity;

mining the time-related data to identify a number of second significant intervals for which the second data characteristic is manifested in time-related data associated with each of the second significant intervals; and presenting in the frame associated with each of the second significant intervals a second representation of the time-related data indicative of the second data characteristic, wherein the second representation comprises one or more adjacently disposed rectangular columns having a second visual characteristic that differs from the first visual characteristic.

9. The method of claim 8, wherein mining the data includes identifying at least one first streak having a plurality of adjacent first significant intervals, and identifying at least one second streak having a plurality of adjacent second significant intervals.

10. The method of claim 1 wherein the variation includes a sequence of intervals, the sequence of intervals comprising one or more of a longest series of intervals or a plurality of a number of longer series for which data associated with the intervals varies from the expected quantity.

11. The method of claim 1, wherein presenting the first representation of the first data characteristic includes:

determining a maximum number of points displayable within the frame;

determining a number of points representative of a data quantity associable with each interval, wherein a proportion of the number of points to the maximum number of points represents a relative magnitude of the first data quantity; and contiguously displaying the number of points in the frame for each of the intervals.

12. The method of claim 1, wherein the at least one data characteristic includes at least one of a vehicle maintenance event, a vehicle repair event, and a vehicle measurement.

13. The method of claim 12, wherein the vehicle comprises an aircraft.

14. The method of claim 11, wherein a proportion of the number of points to the maximum number of points approximately equals a proportion of the data quantity to a data quantity limit.

15. The method of claim 11, further comprising approximately equating the data quantity limit to the maximum number of points.

16. The method of claim 15, further comprising approximately equating the data quantity limit to a maximum of the data quantity for the period.

17. The method of claim 1, further comprising presenting the first representation of the data associated with each of the first significant intervals in a first format including at least one of a color and a fill pattern, the first format being different from that of the frame and other representations within the frame.

18. The method of claim 17, wherein the first format is user-selectable.

19. The method of claim 1, further including:

identifying at least one additional data characteristic to be identified for the data associable with the number of intervals in the period;

mining the body of data to identify a number of additional significant intervals, the additional significant intervals being intervals for which the at least one additional data characteristic is manifested in data associated with each of the additional significant intervals; and presenting in the frame associated with each of the additional significant intervals an additional representation of the additional data characteristic such that the additional representation of the additional data characteristic is distinguishable from the first representation.

20. The method of claim 1, wherein the data indicative of the first data characteristic includes data representative of a plurality of data sources and the data representative of the plurality of data sources is presented using a unified representation format.

21. A method for representing data associable with intervals, the method comprising:
    associating a frame with each of a number of intervals in a time period;
    receiving at least one data characteristic from a user for which the user desires the at least one data characteristic be identified in data associable with the number of intervals in the time period, the at least one data characteristic being based on a variation from an expected quantity;
    mining the data to identify a number of significant intervals, the significant intervals being intervals for which the at least one data characteristic is manifested in data associated with each of the first significant intervals; and
    presenting in the frame associated with each of the first significant intervals a first representation of the data such that the first representation is different from that of the frame and other representations within the frame, wherein the frame comprises a rectangular area and wherein the first representation comprises one or more rectangular columns adjacently disposed within at least a portion of the rectangular area, the one or more rectangular columns having a first visual characteristic, and wherein the first representation includes:
        determining a first number of points representative of a first data quantity associable with each interval, wherein a proportion of the first number of points to the maximum number of points represents a relative magnitude of the first data quantity; and
        contiguously displaying the first number of points as the one or more rectangular columns in the frame for each of the intervals.

22. The method of claim 21, wherein the first representation comprises a perimeter boundable by a pair of contiguous rectangles, the pair of contiguous rectangles including a first rectangle and a second rectangle having a different area than the first rectangle.

23. The method of claim 21, wherein each interval includes a day and the period includes at least one week such that the frames are presented in a week table having days listed along a first axis and days of a week listed along a second axis.

24. The method of claim 21, wherein each interval includes a day and the period includes at least one month such that the frames are presented in a month table having days of a week listed along a first axis and at least one week listed along a second axis.

25. The method of claim 24, wherein each interval includes a day and the period includes at least one year such that the frames are presented in a plurality of month tables.

26. The method of claim 21, wherein mining the data includes identifying at least one streak having a plurality of adjacent first significant intervals.

27. The method of claim 21, wherein the expected quantity includes at least one of an expected number, an expected range, and a standard deviation.

28. The method of claim 26, wherein the at least one data characteristic comprises a first data characteristic based on a first variation from the expected quantity, the method further comprising:
    identifying a second data characteristic based on a second variation from the expected quantity;
    mining the data to identify a number of second significant intervals for which the second data characteristic is manifested in data associated with each of the second significant intervals; and
    presenting in the frame associated with each of the second significant intervals a second representation of the data indicative of the second data characteristic, wherein the second representation comprises one or more adjacently disposed rectangular columns having a second visual characteristic that differs from the first visual characteristic.

29. The method of claim 28, wherein mining the data includes identifying at least one first streak having a plurality of adjacent first significant intervals, and identifying at least one second streak having a plurality of adjacent second significant intervals.

30. The method of claim 21, wherein the variation includes a sequence of intervals, the sequence of intervals comprising one or more of a longest series of intervals or a plurality of a number of longer series for which data associated with the intervals varies from the expected quantity.

31. The method of claim 21, wherein the at least one data characteristic includes at least one of a vehicle maintenance event, a vehicle repair event, and a vehicle measurement.

32. The method of claim 31, wherein the vehicle comprises an aircraft.

33. The method of claim 21, wherein a proportion of the first number of points to the maximum number of points approximately equals a proportion of the first data quantity to a first data quantity limit.

34. The method of claim 21, further comprising approximately equating the first data quantity limit to the maximum number of points.

35. The method of claim 34, further comprising approximately equating the first data quantity limit to a maximum of the first data quantity for the period.

36. The method of claim 21, wherein the data indicative of the first data characteristic includes data representative of a plurality of data sources and the data representative of the plurality of data sources is presented using a unified representation format.

37. A computer-readable medium for representing data associable with intervals, the computer-readable medium comprising:
    a first computer program portion configured to associate a frame with each of a number of intervals in a period;
    a second computer program portion configured to identify a first data characteristic to be identified for data associable with the number of intervals in the period, the first data characteristic being based on a variation from an expected quantity;
    a third computer program portion configured to mine the body of data to identify a number of first significant intervals, the first significant intervals being intervals for which the first data characteristic is manifested in data associated with each of the first significant intervals; and
    a fourth computer program portion configured to present in the frame associated with each of the first significant intervals a first representation of the data indicative of the first data characteristic, wherein the frame comprises a rectangular area and wherein the first representation comprises one or more rectangular columns adjacently disposed within at least a portion of the rectangular area, the one or more rectangular columns having a first visual characteristic.

38. The computer-readable medium of claim 37, wherein the first representation comprises a perimeter boundable by a pair of contiguous rectangles, the pair of contiguous rectangles includes a first rectangle and a second rectangle having a different area than the first rectangle.

39. The computer-readable medium of claim 37, wherein each interval includes a day and the period includes at least one week such that the frames are presented in a week table having days listed along a first axis and days of a week listed along a second axis.

40. The computer-readable medium of claim 37, wherein each interval includes a day and the period includes at least one month such that the frames are presented in a month table having days of a week listed along a first axis and at least one week listed along a second axis.

41. The computer-readable medium of claim 40, wherein each interval includes a day and the period includes at least one year such that the frames are presented in a plurality of month tables.

42. The computer-readable medium of claim 37, wherein mining the data includes identifying at least one streak having a plurality of adjacent first significant intervals.

43. The computer-readable medium of claim 37, wherein the expected quantity includes at least one of an expected number, an expected range, and a standard deviation.

44. The computer-readable medium of claim 42, further comprising:
identifying a second data characteristic for time related data based on a second variation from the expected quantity;
mining the data to identify a number of second significant intervals for which the second data characteristic is manifested in time-related data associated with each of the second significant intervals; and
presenting in the frame associated with each of the second significant intervals a second representation of the time-related data indicative of the second data characteristic, wherein the second representation comprises one or more adjacently disposed rectangular columns having a second visual characteristic that differs from the first visual characteristic.

45. The computer-readable medium of claim 44, wherein mining the data includes identifying at least one first streak having a plurality of adjacent first significant intervals, and identifying at least one second streak having a plurality of adjacent second significant intervals.

46. The computer-readable medium of claim 37, wherein variation includes a sequence of intervals, the sequence of intervals comprising one or more of a longest series of intervals or a plurality of a number of longer series for which data associated with the intervals varies from the expected quantity.

47. The computer-readable medium of claim 37, wherein presenting the first representation of the first data characteristic includes:
a fifth computer program portion adapted to determine a maximum number of points displayable within the frame;
a sixth computer program portion adapted to determine a number of points representative of a data quantity associable with each interval, wherein a proportion of the number of points to the maximum number of points represents a relative magnitude of the first data quantity; and
a seventh computer program portion adapted to contiguously display the number of points in the frame for each of the intervals.

48. The computer-readable medium of claim 37, wherein the first data characteristic includes at least one of a vehicle maintenance event, a vehicle repair event, and a vehicle measurement.

49. The computer-readable medium of claim 48, wherein the vehicle comprises an aircraft.

50. The computer-readable medium of claim 49, wherein a proportion of the number of points to the maximum number of points approximately equals a proportion of the data quantity to a data quantity limit.

51. The computer-readable medium of claim 47, further comprising an eighth computer program portion adapted to approximately equate the data quantity limit to the maximum number of points.

52. The computer-readable medium of claim 51, further comprising a ninth computer program portion adapted to approximately equate the data quantity limit to a maximum of the data quantity for the period.

53. The computer-readable medium of claim 37, further comprising a tenth computer program portion adapted to present the first representation of the data associated with each of the first significant intervals in a first format including at least one of a color and a fill pattern, the first format being different from that of the frame and other representations within the frame.

54. The computer-readable medium of claim 53, wherein the first format is user-selectable.

55. The computer-readable medium of claim 37, further including:
an eleventh computer program portion adapted to identify at least one additional data characteristic to be identified for the data associable with the number of intervals in the period;
a twelfth computer program portion adapted to mine the body of data to identify a number of additional significant intervals, the additional significant intervals being intervals for which the at least one additional data characteristic is manifested in data associated with each of the additional significant intervals; and
a thirteenth computer program portion adapted to present in the frame associated with each of the additional significant intervals an additional representation of the additional data characteristic such that the additional representation of the additional data characteristic is distinguishable from the first representation.

56. The computer-readable medium of claim 37, wherein the data indicative of the first data characteristic includes data representative of a plurality of data sources, and further comprising a fourteenth computer program code portion such that the data representative of the plurality of data sources is presented using a unified representation format.

57. A computer-readable medium for representing data associable with intervals, the computer-readable medium comprising:
a first computer program portion configured to associate a frame with each of a number of intervals in a period;
a second computer program portion configured to receive at least one data characteristic from a user for which the user desires the at least one data characteristic be identified in data associable with the number of intervals in the period, the at least one data characteristic being based on a variation from an expected quantity;
a third computer program portion configured to mine the body of data to identify a number of significant intervals, the significant intervals being intervals for which the at least one data characteristic is manifested in data associated with each of the first significant intervals; and
a fourth computer program portion configured to present in the frame associated with each of the first significant intervals a first representation of the data such that the first representation is different from that of the frame and other representations within the frame, wherein the frame comprises a rectangular area and wherein the first representation comprises one or more rectangular columns adjacently disposed within at least a portion of the rectangular area, the one or more rectangular columns having a first visual characteristic, and wherein the first representation includes:
- a fifth computer program portion configured to determine a first number of points representative of a first data quantity associable with each interval, wherein a proportion of the first number of points to the maximum number of points represents a relative magnitude of the first data quantity; and
- a sixth computer program portion configured to contiguously display the first number of points in the frame for each of the intervals.

58. The computer-readable medium of claim 57, wherein the first representation comprises a perimeter boundable by a pair of contiguous rectangles, the pair of contiguous rectangles includes a first rectangle and a second rectangle having a different area than the first rectangle.

59. The computer-readable medium of claim 57, wherein each interval includes a day and the period includes at least one week such that the frames are presented in a week table having days listed along a first axis and days of a week listed along a second axis.

60. The computer-readable medium of claim 57, wherein each interval includes a day and the period includes at least one month such that the frames are presented in a month table having days of a week listed along a first axis and at least one week listed along a second axis.

61. The computer-readable medium of claim 60, wherein each interval includes a day and the period includes at least one year such that the frames are presented in a plurality of month tables.

62. The computer-readable medium of claim 57, wherein mining the data includes identifying at least one streak having a plurality of adjacent first significant intervals.

63. The computer-readable medium of claim 57, wherein the expected quantity includes at least one of an expected number, an expected range, and a standard deviation.

64. The computer-readable medium of claim 62, wherein the at least one data characteristic comprises a first data characteristic based on a first variation from the expected quantity, the method further comprising:
- identifying a second data characteristic based on a second variation from the expected quantity;
- mining the data to identify a number of second significant intervals for which the second data characteristic is manifested in data associated with each of the second significant intervals; and
- presenting in the frame associated with each of the second significant intervals a second representation of the data indicative of the second data characteristic, wherein the second representation comprises one or more adjacently disposed rectangular columns having a second visual characteristic that differs from the first visual characteristic.

65. The computer-readable medium of claim 64, wherein mining the data includes identifying at least one first streak having a plurality of adjacent first significant intervals, and identifying at least one second streak having a plurality of adjacent second significant intervals.

66. The computer-readable medium of claim 57, wherein the variation includes a sequence of intervals, the sequence of intervals comprising one or more of a longest series of intervals or a plurality of a number of longer series for which data associated with the intervals varies from the expected quantity.

67. The computer-readable medium of claim 57, wherein the at least one data characteristic includes at least one of a vehicle maintenance event, a vehicle repair event, and a vehicle measurement.

68. The computer-readable medium of claim 67, wherein the vehicle comprises an aircraft.

69. The computer-readable medium of claim 57, wherein a proportion of the first number of points to the maximum number of points approximately equals a proportion of the first data quantity to a first data quantity limit.

70. The computer-readable medium of claim 57, further comprising a seventh computer program portion adapted to approximately equate the first data quantity limit to the maximum number of points.

71. The computer-readable medium of claim 70, further comprising an eighth computer program portion adapted to approximately equate the first data quantity limit to a maximum of the first data quantity for the period.

72. The computer-readable medium of claim 57, wherein the data indicative of the first data characteristic includes data representative of a plurality of data sources, and further comprising a ninth computer program code portion such that the data representative of the plurality of data sources is presented using a unified representation format.

* * * * *